(12) United States Patent
Hecht

(10) Patent No.: US 11,731,204 B2
(45) Date of Patent: Aug. 22, 2023

(54) HIGH-FEED MILLING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 223 days.

(21) Appl. No.: 17/481,355

(22) Filed: Sep. 22, 2021

(65) Prior Publication Data
US 2022/0118531 A1     Apr. 21, 2022

Related U.S. Application Data

(60) Provisional application No. 63/093,409, filed on Oct. 19, 2020.

(51) Int. Cl.
| | | |
|---|---|---|
| *B23C 5/06* | (2006.01) | |
| *B23C 5/20* | (2006.01) | |
| *B23C 5/10* | (2006.01) | |
| B23C 5/18 | (2006.01) | |

(52) U.S. Cl.
CPC ............ *B23C 5/109* (2013.01); *B23C 5/1081* (2013.01); *B23C 5/18* (2013.01); *B23C 2200/0405* (2013.01)

(58) Field of Classification Search
CPC ... B23C 5/109; B23C 2210/04; B23C 5/1081; B23C 5/2213; B23C 2200/0405; B23C 2210/168; B23C 2220/48; B23C 2220/56; B23C 5/18
See application file for complete search history.

(56) References Cited

U.S. PATENT DOCUMENTS

| | | | |
|---|---|---|---|
| 4,929,131 A | 5/1990 | Allemann | |
| 5,478,178 A | 12/1995 | Pawlick | |
| 5,964,555 A | 10/1999 | Strand | |
| 6,116,824 A * | 9/2000 | Strand ................... | B23C 5/2213 407/41 |
| 6,508,612 B1 * | 1/2003 | Baca ..................... | B23C 5/2213 407/53 |
| 7,052,214 B2 * | 5/2006 | Janness .................. | B23C 5/109 407/42 |
| 8,851,810 B2 * | 10/2014 | Ishi ....................... | B23C 5/2213 407/42 |
| 9,901,992 B2 * | 2/2018 | Hecht .................... | B23C 5/2213 |
| 2002/0018699 A1 | 2/2002 | Shimomura et al. | |

(Continued)

FOREIGN PATENT DOCUMENTS

| | | |
|---|---|---|
| EP | 2 266 741 | 12/2010 |
| JP | H08 39321 | 2/1996 |

(Continued)

OTHER PUBLICATIONS

International Search Report dated Jan. 5, 2022, issued in PCT counterpart application (No. PCT/IL2021/051170).

(Continued)

*Primary Examiner* — Sara Addisu
(74) *Attorney, Agent, or Firm* — Womble Bond Dickinson (US) LLP

(57) ABSTRACT

A milling tool having a radial cutting edge for milling high-feed rates. The radial cutting edge having first, second and third sub-edges which extend at angles which are relatively small when formed with a longitudinal axis AL of the milling tool, thereby allowing the high-feed rates.

20 Claims, 12 Drawing Sheets

(56) References Cited

U.S. PATENT DOCUMENTS

| | | | |
|---|---|---|---|
| 2006/0104736 A1 | 5/2006 | Satran et al. | |
| 2008/0298917 A1* | 12/2008 | Chang | B23C 5/202 |
| | | | 408/226 |
| 2010/0034602 A1 | 2/2010 | Sung et al. | |
| 2011/0027025 A1 | 2/2011 | Horiike et al. | |
| 2020/0016669 A1 | 1/2020 | Brambs et al. | |
| 2021/0078086 A1* | 3/2021 | Ueno | B23C 5/1081 |
| 2021/0138564 A1* | 5/2021 | Schmida | B23C 5/1018 |
| 2022/0258258 A1* | 8/2022 | Aso | B23C 5/2213 |

FOREIGN PATENT DOCUMENTS

| | | | | |
|---|---|---|---|---|
| JP | H 0839321 | | 2/1996 | |
| JP | 2000288823 A | * | 10/2000 | B23C 5/109 |
| JP | 2009255182 A | * | 11/2009 | B23C 5/109 |
| WO | WO-2015037617 A1 | * | 3/2015 | B23C 5/109 |

OTHER PUBLICATIONS

Written Opinion dated Jan. 5, 2022, issued in PCT counterpart application (No. PCT/IL2021/051170).

\* cited by examiner

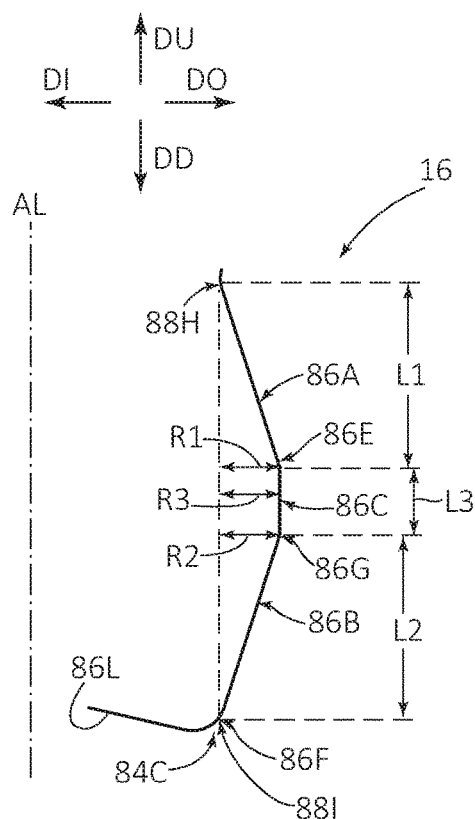
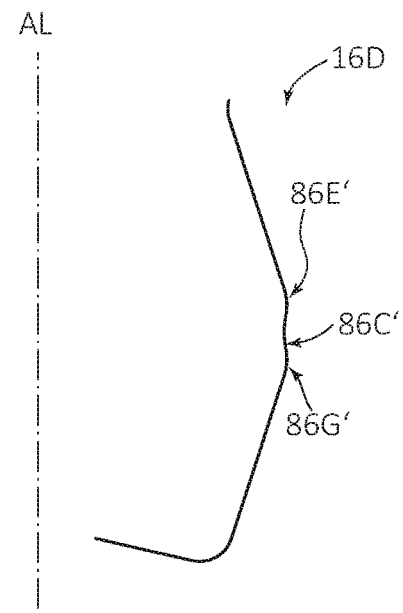
Fig. 11A
Fig. 11B
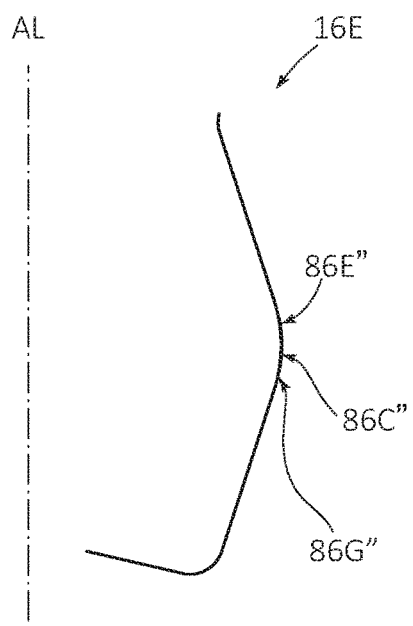
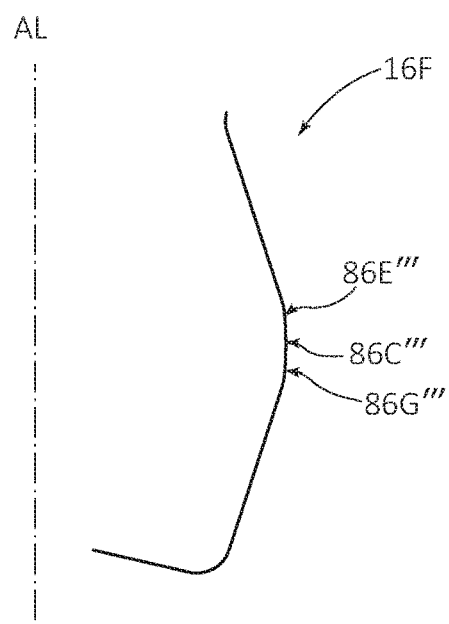
Fig. 11C
Fig. 11D

HIGH-FEED MILLING TOOL

RELATED APPLICATIONS

The present application claims priority to U.S. Provisional Patent Application No. 63/093,409 filed Oct. 19, 2020. The contents of the aforementioned application are incorporated by reference in their entirety.

FIELD OF THE INVENTION

The subject matter of the present invention relates to a method of milling and a milling tool for carrying out such method. While the method may be used with milling tools having geometry even for low or moderate feed rates, particular advantage is found for using the method at high-feed rates and unique geometry milling tools are provided for applying the method at high-feed rates.

BACKGROUND OF THE INVENTION

High-feed milling tools are typically characterized with an axially directed cutting construction designed to remove relatively small chips of metal or like material at relatively high material removal rates, rather than removing relatively larger chips at slower rates.

For example, high-feed milling tools typically carry out shouldering operations within a chip load range of 0.5 mm to 1 mm. A combination of moderate chip load and primarily axially directed forces reduces vibrations when such milling tools machine a workpiece, allowing for high-feed rates.

In the present application, quantitatively, "high-feed" can be considered to include an immersion angle "k" typically fulfills the condition of about $12° \leq k \leq 25°$.

For an insert mill, typical working conditions for high-feed are Vc=120-150 m/min, Fz=0.5-0.8 mm/tooth, whereas for a solid end mill or replaceable head, typical working conditions for high-feed are Vc=150-200 m/min, Fz=0.2-1.0 mm/tooth.

JP3331759B2 discloses a round insert which is used in a milling method including a downward and upward milling motion.

EP2266741A1 claims to be an improvement over JP3331759B2 allowing a "high feed-speed". Since a non-circular cutting insert is employed, to prevent, during the high feed machining in the backward motion of the tool body, the cutting load from concentrating at a "clamp screw 4" holding the cutting insert, an additional "clamp device 5" is disclosed. Additionally, to avoid the thickness of the crossing portion where the wall face 3B and the tip face intersect, an angle θ of inclination is preferably from 10° to 25°.

SUMMARY OF THE INVENTION

A high-feed milling tool according to the present invention differs from most known high-feed milling tools in that the cutting construction is primarily radially directed rather than axially directed.

As the machining forces are consequently directed primarily in the radial direction, the anti-vibration benefits of the known axial high-feed milling tools is reduced in order to achieve a milling tool which is capable of a larger variety of machining operations than known conventional milling tools, in addition to the capability to carry out high-feed milling operations.

Additionally, by milling with one set of sub-edges in one machining direction (e.g. downwardly) and a different set of sub-edges in a different milling direction (e.g. upwardly) greater tool life may, in theory, be achieved.

According to a first aspect of the present invention, there is provided a method of milling a workpiece using a milling tool, the method comprising: a first step S1 of milling the workpiece in a downward direction DD for a first axial distance DA1; a second step S2 of milling the workpiece in an outward radial direction DO for a first radial distance DR1; and a third step S3 of milling the workpiece in an upward direction DU, opposite to the downward direction DD, for a second axial distance DA2 measurable parallel to a longitudinal axis of the milling tool.

In accordance with another aspect of the present invention, there is provided a method of milling a workpiece using a milling tool;

the milling tool having a tool rotation direction and a tool counter-rotation direction opposite thereto and comprising:
an elongated shank portion and a cutting portion connected to the shank portion;
the shank portion defining a longitudinal axis AL which in turn defines a downward direction DD from the shank portion to the cutting portion and an upward direction DU opposite to the downward direction;
an outward radial direction DO is defined perpendicular to the longitudinal axis and outward from the milling tool, and an inward radial direction DI is defined opposite to the outward radial direction;
the cutting portion comprising:
a rake surface;
a relief surface; and
a cutting edge formed along an intersection of the rake surface and the relief surface;
the cutting edge comprising a radial cutting edge;
the radial cutting edge having an axial edge length LAE measurable parallel to the longitudinal axis AL and a radial edge length LRE measureable perpendicular to the longitudinal axis AL;
the method comprising:
a first step S1 of milling the workpiece in the downward direction DD for a first axial distance DA1;
a second step S2 of milling the workpiece in the outward radial direction DO for a first radial distance DR1; and
a third step S3 of milling the workpiece in the upward direction a second axial distance DA2 measurable parallel to the longitudinal axis.

According to either of the aspects above:

The above pattern can be carried out at any starting point (i.e. the method could start at any one of the first, second or the third steps).

The above pattern can be repeated.

The above pattern is relative to the milling tool, yet if it would be referenced to the workpiece it could be carried out at an oblique angle (e.g. relative to the workpiece the milling tool could enter in a downward-outward direction for the first step, an upward-outward direction for the second step, and an upward-inward direction for the third step).

The first step can be performed first and is immediately followed by the second step, and the second step is immediately followed by the third step. Alternatively, the third step can be performed first and is immediately followed by the second step, and the second step is immediately followed by the first step.

The second step involves machining a smaller distance than the first and third steps.

The first axial distance DA1 can fulfill the condition: DA1>LAE, preferably DA1>2LAE and more preferably DA1>4LAE.

The second axial distance DA2 can fulfill the condition: DA2>LAE, preferably DA2>2LAE and more preferably DA2>4LAE.

The first radial distance DR1 can fulfill the condition: DR1<LRE, preferably DR1<0.8LRE.

If the milling tool is an insert mill the working conditions of at least one of the first, second and third steps can be: Vc=120-150 m/min, Fz=0.5-0.8 mm/tooth.

If the milling tool is a solid end mill the working conditions of at least one of the first, second and third steps can be: Vc=120-150 m/min, Fz=0.2-1.0 mm/tooth.

The first step can be helical interpolation or down plunging.

The second step can preferably be side plunging.

The third step can be up plunging.

Subsequent to the third step there can be an additional step, immediately following, of side plunging. Subsequent to the additional step there can be, immediately following, yet another step of down plunging.

The above method steps can be carried out with any of the milling tools having features described below.

According to another aspect of the present invention, there is provided a computer program having instructions which when executed by a computer numerical control lathe causes the computer numerical control lathe to perform the method according to any one of any of the above steps.

According to another aspect of the present invention, there is provided a non-transient computer readable medium having stored thereon a computer program according to the previous aspect.

According to another aspect of the present invention, there is provided a data stream which is representative of a computer program according to the previous aspect.

According to another aspect of the present invention, there is provided a computer-aided manufacturing program comprising software in a non-transient memory which, when executed, generates G-code configured to instruct a CNC machine to perform the method according to any of the above steps.

It will be understood that traditional computer numerical control lathes are not traditionally programmed to carry out the above pattern.

According to another aspect of the present invention, there is provided a milling tool having a tool rotation direction and a tool counter-rotation direction opposite thereto and comprising: a radial cutting edge comprising:
  a first sub-edge having a first longitudinal length L1 and a first radial length R1;
  a second sub-edge located downwardly of the first sub-edge and having a second longitudinal length L2 and a second radial length R2; and
  a third sub-edge connecting the first and second sub-edges and having a third longitudinal length L3 and a third radial length R3;
  the first sub-edge extends towards the third sub-edge in the downward and outward radial directions; and
  the second sub-edge extends towards the third sub-edge in the upward and outward radial directions;
wherein, in a view facing the rake surface, at least one of the following two conditions is fulfilled:
  a first condition wherein: the first sub-edge comprises a first uppermost point and a first lowermost point which define a first imaginary line IL1; a first sub-edge angle k1 is formed between the first imaginary line IL1 and the longitudinal axis AL; and the first sub-edge angle k1 fulfills the condition: $12°<k1<25°$, preferably $15°<k1<22'$; and a second condition wherein: the second sub-edge comprises a second uppermost point and a second lowermost point which define a second imaginary line IL2; a second sub-edge angle k2 is formed between the first imaginary line IL1 and the longitudinal axis AL; and the second sub-edge angle k2 fulfills the condition: $12°<k2<25°$, preferably $15°<k2<22°$.

According to another aspect of the present invention, there is provided a milling tool having a tool rotation direction and a tool counter-rotation direction opposite thereto and comprising:
  an elongated shank portion and a cutting portion connected to the shank portion;
  the shank portion defining a longitudinal axis AL which in turn defines a downward direction DD from the shank portion to the cutting portion and an upward direction DU opposite to the downward direction;
  an outward radial direction OD is defined perpendicular to the longitudinal axis and outward from the milling tool, and an inward radial direction DI is defined opposite to the outward radial direction;
the cutting portion comprising:
  a rake surface;
  a relief surface; and
  a cutting edge formed along an intersection of the rake surface and the relief surface;
the cutting edge comprising a radial cutting edge;
the radial cutting edge having an axial edge length LAE measurable parallel to the longitudinal axis AL and a radial edge length LRE measureable perpendicular to the longitudinal axis AL, and comprising:
  a first sub-edge having a first longitudinal length L1 and a first radial length R1;
  a second sub-edge located downwardly of the first sub-edge and having a second longitudinal length L2 and a second radial length R2; and
  a third sub-edge connecting the first and second sub-edges and having a third longitudinal length L3 and a third radial length R3;
  the third longitudinal length L3 is shorter than both the first longitudinal length L1 and the second longitudinal length L2;
  the first sub-edge extends towards the third sub-edge in the downward and outward radial directions; and
  the second sub-edge extends towards the third sub-edge in the upward and outward radial directions.

According to another aspect of the present invention, there is provided a milling tool having a tool rotation direction and a tool counter-rotation direction opposite thereto and comprising:
  an elongated shank portion and a cutting portion connected to the shank portion;
  the shank portion defining:
    a longitudinal axis AL which in turn defines a downward direction DD from the shank portion to the cutting portion and an upward direction DU opposite to the downward direction; and
    an outward radial direction DO is defined perpendicular to the longitudinal axis and outward from the milling tool, and an inward radial direction DI is defined opposite to the outward radial direction;
the cutting portion comprising:
  a rake surface;
  a relief surface; and a cutting edge formed along an intersection of the rake surface and the relief surface;

the cutting edge comprising a radial cutting edge having an axial edge length LAE measurable parallel to the longitudinal axis AL and a radial edge length LRE measureable perpendicular to the longitudinal axis AL;

the radial cutting edge comprising:
- a first sub-edge having a first longitudinal length L1 and a first radial length R1;
- a second sub-edge located downwardly of the first sub-edge and having a second longitudinal length L2 and a second radial length R2; and
- a third sub-edge connecting the first and second sub-edges and having a third longitudinal length L3 and a third radial length R3;
- the third longitudinal length L3 is shorter than both the first longitudinal length L1 and the second longitudinal length L2;

wherein the first sub-edge extends towards the third sub-edge in the downward and outward radial directions; and
the second sub-edge extends towards the third sub-edge in the upward and outward radial directions;
wherein, in a view facing the rake surface, at least one of the following two conditions is fulfilled:
- a first condition wherein: the first sub-edge comprises a first uppermost point and a first lowermost point which define a first imaginary line IL1; a first sub-edge angle k1 is formed between the first imaginary line IL1 and the longitudinal axis AL; and the first sub-edge angle k1 fulfills the condition: $12° < k1 < 25°$, preferably $15° < k1 < 22$; and
- a second condition wherein: the second sub-edge comprises a second uppermost point and
- a second lowermost point which define a second imaginary line IL2; a second sub-edge angle k2 is formed between the second imaginary line IL2 and the longitudinal axis AL;
- and the second sub-edge angle k2 fulfills the condition: $12° < k2 < 25°$, preferably $15° < k2 < 22°$.

According to another aspect of the present invention, there is provided a milling tool comprising an insert-mill holder according to any one of the previous aspects and a cutting insert mounted to said insert pocket:

the cutting insert comprising:
a rake surface;
a bottom surface opposite the rake surface;
an insert axis passing through the center of the rake surface and bottom surface and defining
an upward insert direction and a downward insert direction opposite thereto;
a relief surface connecting the rake surface to the bottom surface; and
a cutting edge formed along an intersection of the rake surface and the relief surface;
the relief surface comprising:
a support portion in turn comprising first, second and third insert abutment surfaces;
wherein the cutting insert is mounted to the insert pocket with:
the insert's bottom surface abutting the insert seat surface;
the first insert abutment surface abutting the first support wall;
the second insert abutment surface abutting the second support wall; and
the third insert abutment surface abutting the third support wall.

According to another aspect of the present invention, there is provided a milling tool wherein the radial cutting edge projects further in the outward direction than the radial peripheral surface along the cutting portion of the insert-mill holder.

Preferably a majority of an uppermost corner to which the radial cutting edge is connected projects further in the outward direction than the radial peripheral surface along the cutting portion of the insert-mill holder, preferably an entirety of the uppermost corner.

Preferably a majority of a lowermost corner to which the radial cutting edge is connected projects further in the outward direction than the radial peripheral surface along the cutting portion of the insert-mill holder, preferably an entirety of the lowermost corner.

The uppermost corner is preferably located precisely in the upward direction above the lowermost corner.

Preferably at least one of, and preferably both of, the uppermost corner and the lowermost corner are radiused corners.

According to another aspect of the present invention, there is provided a milling tool comprising an insert-mill holder and a cutting insert mounted to an insert pocket of said insert-mill holder;

the cutting insert comprising:
a rake surface;
a bottom surface opposite the rake surface and being formed with at least one safety recess;
an insert axis passing through the center of the rake surface and bottom surface and defining
an upward insert direction and a downward insert direction opposite thereto;
a relief surface connecting the rake surface to the bottom surface; and
a cutting edge formed along an intersection of the rake surface and the relief surface;
the insert pocket comprising
an insert seat surface comprising a safety projection; and
a plurality of support walls;
wherein, the safety recess accommodates the safety projection, leaving a gap all around the safety projection.

According to any of the aspects above:
The cutting insert can be clamped (or secured) to an insert pocket only via a screw. Stated differently each insert pocket is formed with only a threaded bore for securing a cutting insert.

The angles can fulfill the condition: k1=k2.

In a view facing the relief surface, the first sub-edge can be straight or concavely-curved.

In a view facing the relief surface, the second sub-edge can be straight or concavely-curved.

In a view facing the relief surface, the third sub-edge can be straight or concavely-curved.

In a view facing the rake surface, the third sub-edge can be straight or concavely-curved or convex.

In a view facing the rake surface, the first sub-edge can be straight or convexly-curved (the latter not being shown).

In a view facing the rake surface, the second sub-edge can be straight or convexly-curved (the latter not being shown).

In a view facing the rake surface, the third sub-edge can be straight or convexly-curved (the latter not being shown).

The milling tool can further comprise a fourth sub-edge extending from the second sub-edge in the inward radial direction. Preferably, the fourth sub-edge extends from the second sub-edge in both the inward radial and upward directions.

The milling tool can be an insert-mill holder and the cutting portion is formed on at least one cutting insert. Alternatively, the milling tool can be a solid end mill with a cylindrical shank portion and the cutting portion is formed on at least one integrally formed tooth. Alternatively, the milling tool can be a replaceable milling head with a threaded shank portion and the cutting portion is formed on at least one integrally formed tooth.

The milling tool can have any of the features below.

According to another aspect of the present invention, there is provided an insert-mill holder having a tool rotation direction and a tool counter-rotation direction opposite thereto and comprising:
- an elongated shank portion and a cutting portion connected to the shank portion;
- the shank portion defining a longitudinal axis AL which in turn defines a downward direction DD from the shank portion to the cutting portion and an upward direction DU opposite to the downward direction;
- an outward radial direction DO is defined perpendicular to the longitudinal axis and outward from the milling tool, and an inward radial direction DI is defined opposite to the outward radial direction;

the cutting portion comprising at least one insert pocket;
the insert pocket comprising:
- an insert seat surface;
- a downwardly facing first support wall projecting from the insert seat surface in the rotation direction;
- an upwardly facing second support wall projecting from the insert seat surface in the rotation direction and located downward of the first support wall; and
- a threaded bore opening out to the insert seat surface and having a bore axis;

wherein:
- the bore axis forms a first external bore angle a1 with the insert seat surface in the outward radial direction fulfilling the condition: $72°<a1<88°$, preferably $75°<a1<85°$.

According to another aspect of the present invention, there is provided an insert-mill holder having a tool rotation direction and a tool counter-rotation direction opposite thereto and comprising:
- an elongated shank portion and a cutting portion connected to the shank portion;
- the shank portion defining a longitudinal axis AL which in turn defines a downward direction DD from the shank portion to the cutting portion and an upward direction DU opposite to the downward direction;
- an outward radial direction DO is defined perpendicular to the longitudinal axis and outward from the milling tool, and an inward radial direction DI is defined opposite to the outward radial direction;

the cutting portion comprising at least one insert pocket;
the insert pocket comprising:
- an insert seat surface;
- a first support wall extending in both the inward radial and downward directions;
- a second support wall extending in both the outward radial and downward directions; and
- a third support wall, located downwardly of the first support wall and upwardly of the second support wall and extending non-parallel relative to the first support wall and second support wall.

According to any of the aspects above:

The threaded bore can comprise a threaded section and a relief section having a greater diameter than the threaded section, the relief section being closer than the threaded section to the insert seat surface.

The insert pocket further can comprise a third support wall, located downwardly of the first support wall and upwardly of the second support wall and extending non-parallel relative to both the first support wall and the second support wall.

The first support wall can comprise a first uppermost first support wall point and a first lowermost first support wall point. The first support wall extends from the first uppermost first support wall point to the first lowermost first support wall point in both the inward radial and downward directions.

The second support wall can comprise a second uppermost second support wall point and a second lowermost second support wall point. The second support wall extends from the second uppermost second support wall point to the second lowermost second support wall point in both the outward radial and downward directions.

The third support wall can comprise a third uppermost third support wall point and a third lowermost third support wall point and the third support wall extends from the third uppermost third support wall point to the lowermost third support wall point in both the inward radial and downward directions.

The first support wall can extend more than the second support wall in the outward radial direction.

The first support wall can extend less than the second support wall in the inward radial direction.

A first external angle $β1$ can be formed between the first support wall and the third support wall and fulfills the condition: $130°<β1<150°$, preferably $135°<β1<145°$.

A second external angle $β2$ can be formed between the second support wall and the third support wall and fulfills the condition: $80°<β2<120°$, preferably $90°<β2<110°$.

The insert pocket can further comprise a safety projection projecting from the insert seat surface in the rotation direction.

The insert pocket can further comprise a threaded bore opening out to the insert seat surface and having a bore axis; the bore axis forming a first external bore angle a1 with an insert seat surface in the outward radial direction fulfilling the condition: $72°<a1<88°$, preferably $75°<a1<85°$.

The bore axis can form a second external bore angle a2 with an imaginary bore plane PB extending through the center of the bore in the outward radial direction in a view of the insert seat surface, fulfilling the condition: $3°<a2<15°$, preferably $7°<a2<13°$.

According to another aspect of the present invention, there is provided a method of mounting a cutting insert to an insert pocket, comprising a milling tool according to any one of the two previous claims, comprising:
- a first step of placing the cutting insert in the insert pocket such that: the insert's bottom surface abuts the insert seat surface;
- a second step of partially clamping the cutting insert to bring the first insert abutment surface into abutment with the first support wall and the third insert abutment surface into abutment with the third support wall; and
- a third step of fully clamping the cutting insert such that it rotates on the insert seat surface bringing the second insert abutment surface into abutment with the second support wall.

According to another aspect of the present invention, there is provided a single-sided milling insert with a positive basic shape and comprising:
- a rake surface;

a bottom surface opposite the rake surface;
an insert axis passing through the center of the rake surface and bottom surface and defining an upward insert direction and a downward insert direction opposite thereto;
a relief surface connecting, and converging inwardly from, the rake surface to the bottom surface; and
a cutting edge formed along an intersection of the rake surface and the relief surface;
the cutting edge comprising a radial cutting edge extending between two corners of the cutting insert;
the radial cutting edge having an axial edge length LAE and a radial edge length LRE, and comprising:
a first sub-edge having a first longitudinal length L1 and a first radial length R1;
a second sub-edge located downwardly of the first sub-edge and having a second longitudinal length L2 and a second radial length R2; and
a third sub-edge connecting the first and second sub-edges, at least partially facing the outward radial direction, and having a third longitudinal length L3 and a third radial length R3;
the third longitudinal length L3 is shorter than both the first longitudinal length L1 and the second longitudinal length L2;
the first sub-edge extends towards the third sub-edge in the downward and outward radial directions; and
the second sub-edge extends towards the third sub-edge in the upward and outward radial directions.

BRIEF DESCRIPTION OF THE DRAWINGS

For a better understanding of the subject matter of the present application, and to show how the same may be carried out in practice, reference will now be made to the accompanying drawings, in which:

FIG. 11A is a schematic top view of a cutting edge according to the present invention, particularly showing a straight third sub-edge;

FIG. 11B is a schematic top view of another cutting edge according to the present invention, particularly showing a concavely-curved third sub-edge;

FIG. 11C is a schematic top view of another cutting edge according to the present invention, particularly showing a first type of convexly-curved third sub-edge;

FIG. 11D is a schematic top view of another cutting edge according to the present invention, particularly showing a second type of convexly-curved third sub-edge;

DETAILED DESCRIPTION

Figure 1:
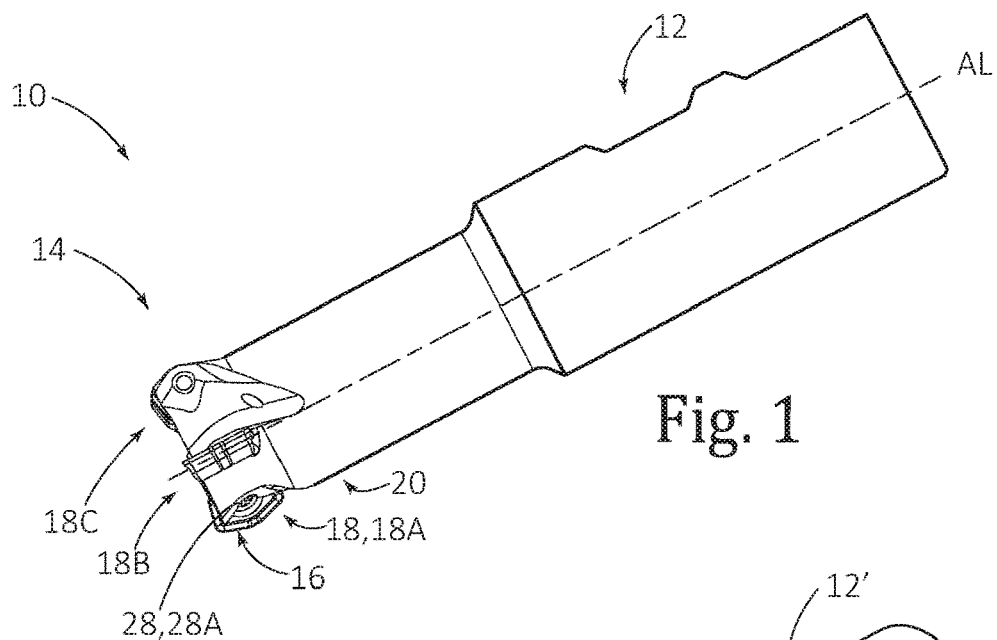
FIG. 1 is a perspective view of a high-feed milling tool, particularly an insert-mill holder with inserts mounted thereto, according to the present invention.
Figure 2:
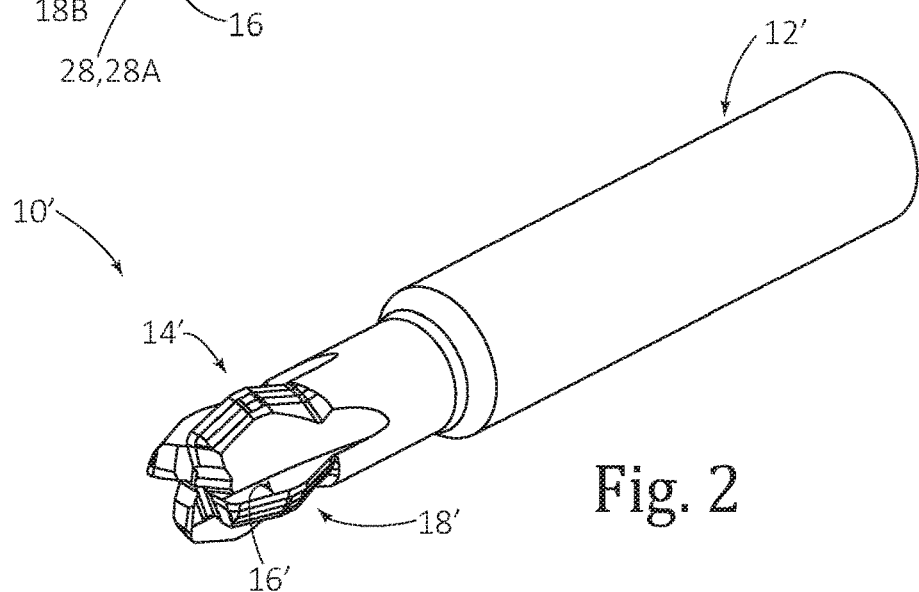
FIG. 2 is a perspective view of another high-feed milling tool, particularly an integrally formed (or "solid") endmill having a cylindrical shank, according to the present invention.
Figure 3:
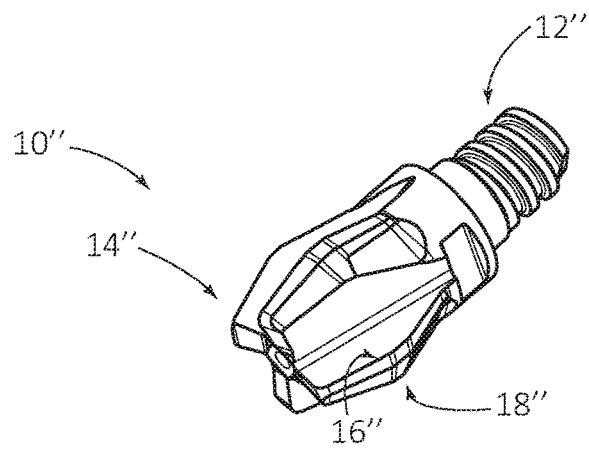
FIG. 3 is a perspective view of yet another high-feed milling tool, particularly an integrally formed (or "solid") replaceable milling head which is similar to FIG. 2 except with a short threaded shank, according to the present invention.

Referring to FIGS. 1 to 3, there are illustrated three different examples of high-feed milling tools 10, 10', 10" according to the present invention.

Generally speaking, the milling tool 10 in FIG. 1 comprises an elongated shank portion 12 defining a longitudinal axis AL extending through the center thereof, and a cutting portion 14 connected to the shank portion 12.

The cutting portion 14 comprises at least one radial cutting edge 16 of a particular shape and orientation which will be described below.

Notably, in the specific example of the milling tool 10 in FIG. 1, the radial cutting edge 16 is formed on a cutting insert 18. Stated differently, the milling tool 10 comprises an insert-mill holder 20 and a plurality of said cutting inserts 18 (in this non-limiting embodiment first, second and third cutting inserts 18A, 18B, 18C), and each of said cutting inserts 18 comprises at least one radial cutting edge 16 having said particular shape and orientation.

However, a cutting edge according to the present invention can alternatively be formed on an integrally formed cutting portion of a milling tool, as shown in FIGS. 2 and 3.

To elaborate, the milling tool 10' in FIG. 2 (typically referred to as a solid endmill) comprises an elongated shank portion 12', having a basic cylindrical shape, and a cutting portion 14' connected to the shank portion 12'.

The cutting portion 14' comprises at least one radial cutting edge 16', corresponding in shape and orientation to the radial cutting edge 16 in FIG. 1, yet integrally formed on a so-called tooth 18'.

The milling tool 10" in FIG. 3 (typically referred to as a replaceable milling head) comprises an elongated shank portion 12" and a cutting portion 14" connected to the shank portion 12".

The cutting portion 14" also comprises at least one radial cutting edge 16", corresponding in shape and orientation to the radial cutting edge 16 in FIG. 1, yet integrally formed on a tooth 18". However, different to the milling tool 10' in FIG. 2, the shank portion 12" is of a threaded type. As will be understood below, the present invention is of particular advantage for large depth machining applications to which replaceable heads are particularly suited.

Since the present invention is primarily directed to a cutting portion, or more specifically a cutting edge shape and orientation, it will be described in detail with reference to only one example of the milling tool, specifically the first example milling tool 10 in FIG. 1. It should be understood that this is applicable to other types of milling tools, for example the milling tools 10', 10" as shown in FIGS. 2 and 3 or even milling tools with different cutting insert types (e.g. two-way indexable, four-way indexable, etc.).

The insert-mill holder 20 will now be described in detail referring to FIGS. 1 and 4A to 4F.

As mentioned, the milling tool 10 comprises a longitudinal axis AL defined by the elongated shank portion 12.

The longitudinal axis AL defines a downward direction DD from the shank portion 12 to the cutting portion 14 and an upward direction DU opposite to the downward direction DD.

An outward radial direction DO is defined perpendicular to the longitudinal axis AL and outward from the center of the milling tool 10. An inward radial direction DI is defined opposite to the outward radial direction DO.

A tool rotation direction DR is defined as the direction of rotation of the milling tool 10 during machining about the longitudinal axis AL, and a tool counter-rotation direction CR is defined opposite thereto.

The insert-mill holder 20 comprises a radial peripheral surface 22 extending along the longitudinal axis AL and an end surface 24 extending basically perpendicular to the longitudinal axis AL.

A radial plane PR (FIG. 4D) is defined as extending perpendicular to the longitudinal axis AL and located at the end surface 24.

More precisely, for the milling tool 10, the insert-mill holder 20 comprises the abovesaid shank portion 12 and cutting portion 14.

In this example, the cutting portion 14 comprises a plurality of circumferentially spaced insert pockets 26 (in this non-limiting embodiment: first, second and third insert pockets 26A, 26B, 26C) formed at an intersection of the radial peripheral surface 22 and the end surface 24 and separated by flutes 30 (in this non-limiting embodiment: first, second and third flutes 30A, 30B, 30C).

As shown in FIG. 1, the milling tool 10 comprises a plurality of said cutting inserts 18, each secured by a screw 28 to a respective insert pocket 26.

Since each of the insert pockets 26, screws 28 and cutting inserts 18 are identical, features will now be described without reference to any particular insert pocket 26, screw 28 or cutting inserts 18.

Figure 6A:
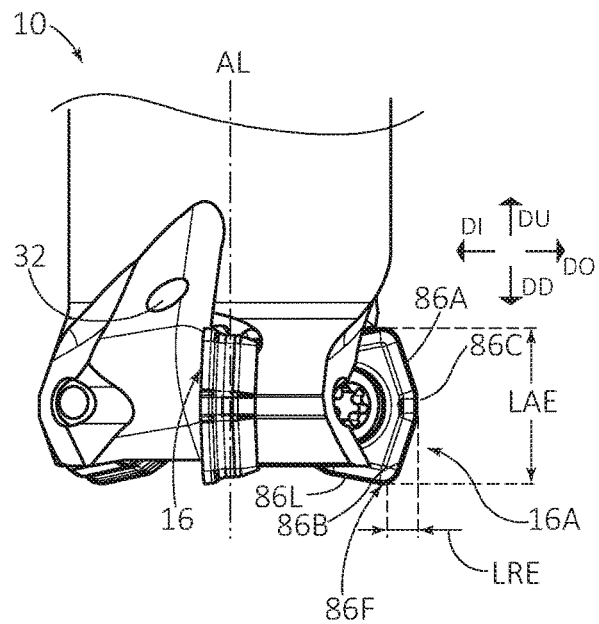
FIG. 6A is another side view of the cutting portion in FIG. 1, particularly facing a cutting insert's relief surface, the cutting insert being located near the center of the bottom of the drawing.

Referring briefly also to FIG. 6A, a coolant channel outlet 32 opens out to each of the flutes 30 and is directed towards the radial cutting edge 16.

Each insert pocket 26 comprises a pocket lateral surface 34 (FIG. 4E) and an insert seat surface 36.

Each insert pocket 26, and more specifically each pocket lateral surface 34, comprises a plurality of support walls 38 (in this non-limiting but preferred embodiment: a first support wall 38A, a second support wall 38B and a third support wall 38C). In the insert holder, the first support wall 38A is axially rearwardmost (i.e., farthest from the end surface 24) and therefore may be referred to as the rear support wall 38A. The second support wall 38B is axially forwardmost (i.e., closest to the end surface 24) and therefore may be referred to as the forward support wall 38B. Finally, the third support wall 38C is axially in between the forward and rear support walls 38B,38A and so may be referred to as the middle support wall 38C.

First, second and third relief recesses 40A, 40B, 40C (also referred to herein as "first, second, and third seat lower relief recesses 40A, 40B, 40C") are formed between the insert seat surface 36 and the first, second and third support walls 38A, 38B, 38C, respectively.

Fourth and fifth relief recesses 42A, 42B (also referred to herein as "first, second, and third seat corner relief recesses 42A, 42B") are formed between the first and third support walls 38A, 38C and the second and third support walls 38B, 38C, respectively.

Sixth, seventh and eighth relief recesses 44A, 44B, 44C (also referred to herein as "first, second, and third seat upper relief recesses 44A, 44B, 44C") are formed above the first, second and third support walls 38A, 38B, 38C, respectively.

It will be understood that it is possible for an insert mill holder 20 according to the present invention to function, the third support wall 38C exemplified is not essential. However, it is beneficial for providing support for the sideways machining operation shown in FIG. 7B and is therefore preferred for at least this reason.

Figure 4A:
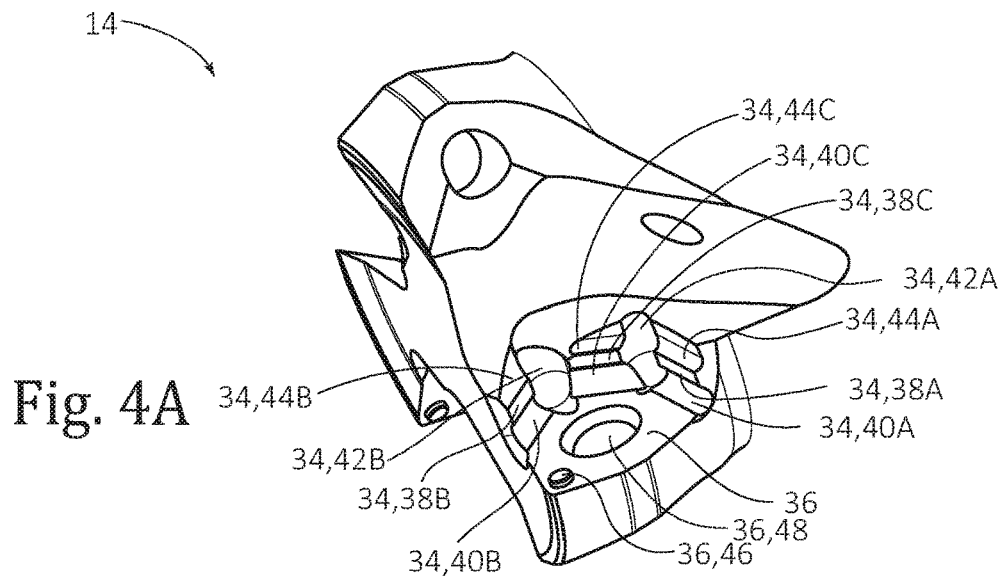
FIG. 4A is a perspective view of a cutting portion of the insert-mill holder of the milling tool in FIG. 1.
Figure 4B:
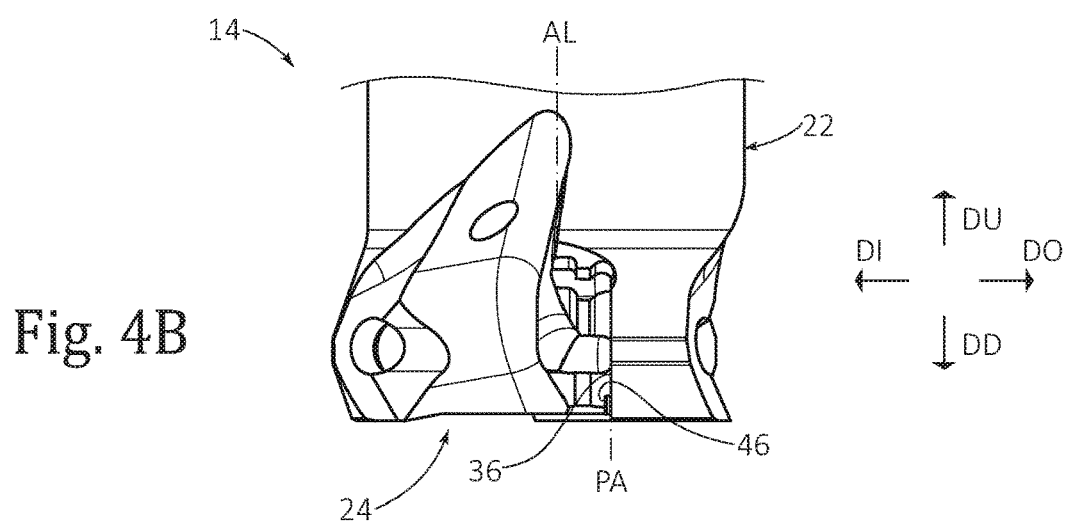
FIG. 4B is a side view of the cutting portion in FIG. 4A, particularly the view faces the side of an insert pocket's insert seat surface located near the center of the bottom of the drawing.
Figure 4C:
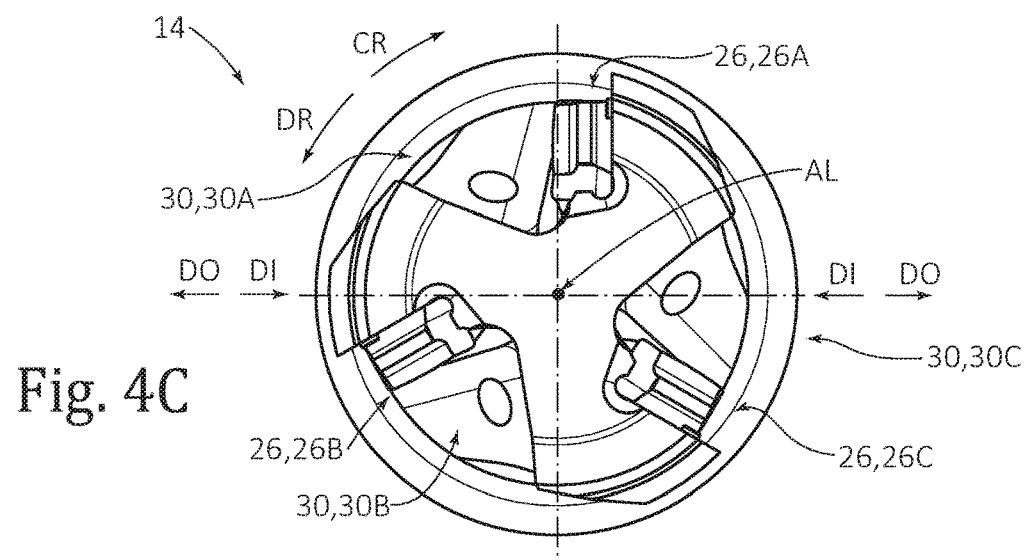
FIG. 4C is a bottom view of the cutting portion in FIG. 4B.
Figure 4D:
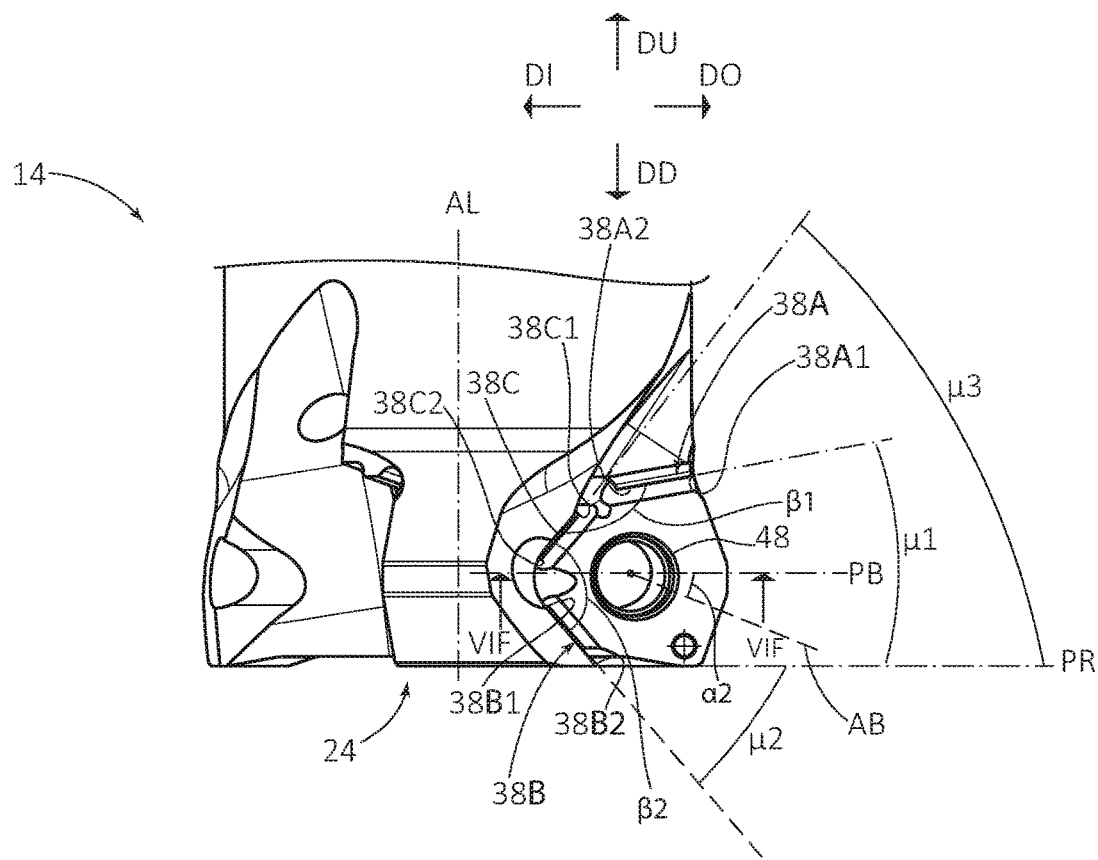
FIG. 4D is another side view of the cutting portion in FIG. 4A, particularly the view faces an insert pocket's insert seat surface located at the lower right side of the drawing.
Figure 4E:
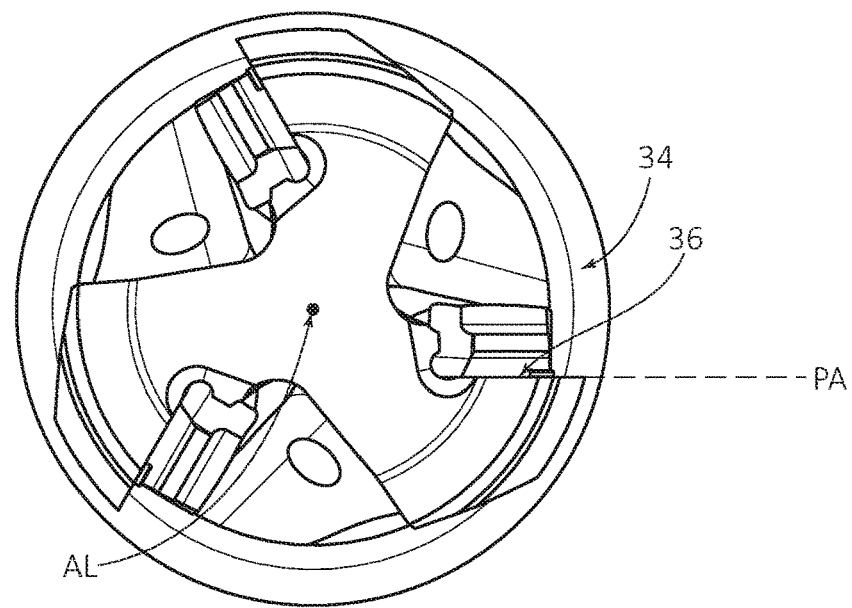
FIG. 4E is a bottom view of the cutting portion in FIG. 4D.

Drawing attention to FIG. 4D, the first (rear) support wall 38A faces in both the downward and outward radial directions DD, DO. To elaborate on the orientation of the first support wall 38A, the first support wall 38A comprises an uppermost first support wall point 38A1 and a lowermost first support wall point 38A2. The first support wall 38A extends from the uppermost first support wall point 38A1 to the lowermost first support wall point 38A2 in both the inward radial and downward directions DI, DD. Stated differently, the first support wall 38A forms an acute first wall angle µ1 in both the outward radial and upward directions DO, DU with the radial plane PR. Preferably the first wall angle µ1 fulfills the condition: 5°<µ1<15°, more preferably 8°<µ1<12°.

The second (forward) support wall 38B is located in the downward direction DD from the first (rear) support wall 38A. The second support wall 38B faces in both the upward and outward radial directions DU, DO. To elaborate on the orientation of the second support wall 38B, the second support wall 38B comprises an uppermost second support wall point 38B1 and a lowermost second support wall point 38B2. The second support wall 38B extends from the uppermost second support wall point 38B1 to the lowermost second support wall point 38B2 in both the outward radial and downward directions DO, DD. Stated differently, the second support wall 38B can form an acute second wall angle µ2 in both the outward radial and downward directions DO, DD with the radial plane PR. Preferably the second wall angle µ2 fulfills the condition: 40°<µ2<60°, more preferably 45°<µ2<55°.

The first (rear) support wall 38A extends more than the second (forward) support wall 38B in the outward radial direction DO. The first support wall 38A preferably extends in the outward radial direction DO as much as possible, preferably until the radial peripheral surface 22 as shown, which provides more support for the cutting insert 18, when machining downwardly DD.

While it would be beneficial for machining in the upward direction DU for the second (forward) support wall 38B to similarly extend in the outward radial direction DO as much as possible, preferably until the radial peripheral surface 22, for the same reason, there is also a benefit in the example shown where the second support wall 38B does not extend to the radial peripheral surface 22 as shown. In the present example the second support wall 38B extends to the end surface 24 allowing, as will be described below, the cutting edge 68 to comprise an axial sub-edge 86L (i.e. a cutting edge extending from the end surface in the downward direction), enabling facing milling operations (ramping, facing, etc.).

The first (rear) support wall 38A also extends less than the second (forward) support wall 38B in the inward radial direction DI.

The third (middle) support wall 38C is located in the downward direction DD from the first (rear) support wall 38A and the upward direction DU from the second (forward) support wall 38B and extends non-parallel relative to the first support wall 38A and second support wall 38B. The third support wall 38C faces in both the downward and outward radial directions DD, DO. To elaborate on the orientation of the third support wall 38C, the third support wall 38C comprises an uppermost third support wall point 38C1 and a lowermost third support wall point 38C2. The third support wall 38C extends from the uppermost third support wall point 38C1 to the lowermost third support wall point 38C2 in both the inward radial and downward directions DI, DD. Stated differently, the third support wall 38C can form an acute third wall angle µ3 in both the outward radial and upward directions DO, DU with the radial plane PR. Preferably the third wall angle µ3 fulfills the condition: 40°<µ3<60°, more preferably 45°<µ3<55°.

When viewed in the counter-rotation direction CR, or, stated differently, in a view facing the insert seat surface 36 (stated differently, the view exemplified in FIG. 4D) a first external angle β1 is formed between the first (rear) support wall 38A and the third (middle) support wall 38C, which fulfills the condition: 130°<β1<150°, preferably 135°<β1<145°.

When viewed in the counter-rotation direction, or, stated differently, in a view facing the insert seat surface 36 as in the view exemplified in FIG. 4D, a second external angle β2 is formed between the second (forward) support wall 38B and the third (middle) support wall 38C, which fulfills the condition: 80°<β2<120°, preferably 90°<β2<110°.

It should be understood that these values are preferred for the exemplified three-way-indexable rotationally symmetric insert shown, and can be rotated appropriately for other insert shapes (e.g. a two-way indexable insert, a four-way indexable insert).

As best shown in FIG. 4B, each insert seat surface 36 extends neutrally. To elaborate, each insert seat surface 36 extends in an axial plane PA which is parallel to the longitudinal axis AL. While it is common to slant an insert seat surface in a so-called positive or negative orientation (e.g. to assist with chip evacuation or structural strength) to reduce complexity of production of the cutting insert and insert pocket, and allow for the unusual condition in which chips will be removed in both the upward and downward directions, a neutral orientation was chosen for the preferred embodiment.

However, it will be understood that the method and milling tools of the present invention can also be performed with a negatively or positively slanted insert seat surface or rake surface.

The insert seat surface 36 can optionally comprise a safety projection 46 projecting in the rotation direction.

While insert seat projections are known, this particular projection 46 has an atypical safety function in that it is not intended to be an abutment surface providing a cutting insert mounted on an insert seat surface with a defined mounted position, but rather is intended to be spaced-apart from the cutting insert and contact it only in a case where the desired abutment surfaces are unable to maintain contact. This non-limiting feature may be added due to the unusual number of machining directions as will be described below. It will be understood that in the present preferred configuration, where the cutting insert is desired to contact three (and not two) abutment walls along a pocket lateral surface, introducing a projection designed to always contact the cutting insert would likely, if not certainly, prevent the desired three-contact configuration described below.

Figure 4F:
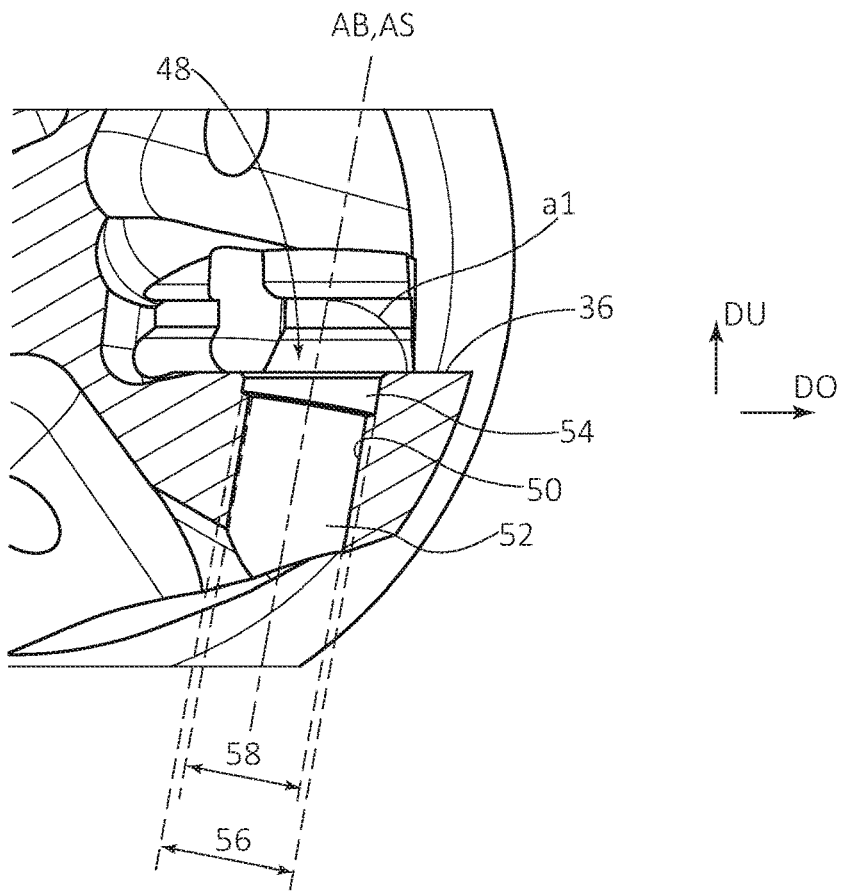
FIG. 4F is a section view along line IVF-IVF in FIG. 4D.

Referring particularly to FIGS. 4D and 4F, the insert seat surface 36 can optionally, yet preferably, be formed with a threaded bore 48 (the threading of which is not shown but is schematically designated in FIG. 4F as "50").

Notably, the threading 50 is of a standard type, such that a clockwise rotation of said screw 28 (FIG. 1) brings the screw 28 further into the threaded bore 48.

It will be understood that other clamping means for a cutting insert are possible, e.g. such as a top-clamp configured to abut an abutment arrangement in the top of a cutting insert (not shown) however the preferred embodiment of a threaded bore is exemplified (as an advantage of better chip flow across an insert rake surface is possible when using a screw and threaded bore configuration; yet a unique difficulty was overcome due to the atypical machining directions, as described below).

The threaded bore 48 opens out to the insert seat surface 36 and comprises a bore axis AB, a threaded section 52 comprising said threading 50 and, preferably, a relief section 54 which is devoid of threading.

Figure 4G:
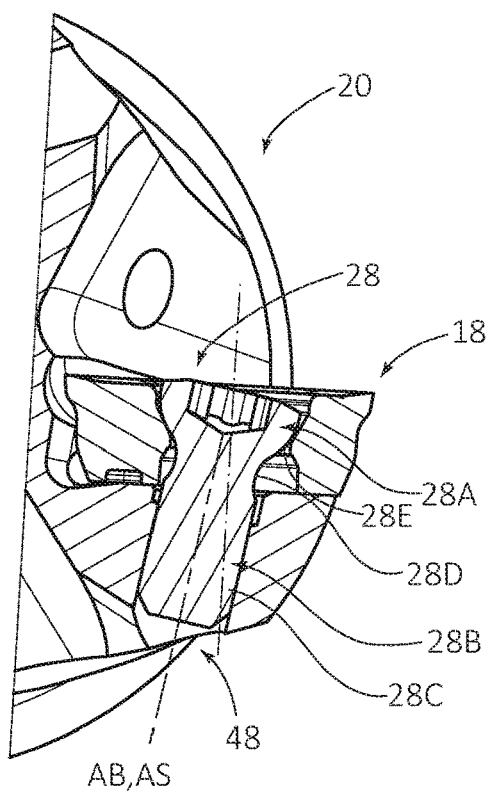
FIG. 4G is a section view similar to FIG. 4F except further including a screw and cutting insert.

For the sake of completeness, the screw 28 in FIG. 4G is shown in more detail. The screw 28 comprises a screw head 28A and a threaded screw shank 28B (the threading of which is not shown but is schematically designated in FIG. 4F as "28C") extending along a screw axis AS. At a connection region of the screw head 28A and the threaded screw shank 28B there is a neck portion 28D which provides a relief function. Notably, adjacent the neck portion 28D the screw head 28A has been provided with an atypical spherical portion 28E, provided to ensure continuous contact with the cutting insert 18.

When secured to the threaded bore 48, the screw 28 has a screw axis AS extending coaxially with the bore axis AB.

Atypically, it was chosen for the threaded bore 48 to extend obliquely relative to the insert seat surface 36. Stated differently, the bore axis AB extends oblique to the insert seat surface 36 (and consequently, correspondingly, said screw 28 extends oblique to the cutting insert's bottom surface 62).

To elaborate, in a view perpendicular to the insert seat surface 36 (which in this case is a section view as shown in FIG. 4F) a first external bore angle a1 is defined between the bore axis AB and the insert seat surface 36 in a bottom view of the insert holder parallel to the insert seat surface 36. The first external bore angle a1 fulfils the condition: $72°<a1<88°$, preferably $75°<a1<85°$.

Such oblique orientation of the bore axis AB is beneficial for the unusual forces applied on the cutting insert due to the numerous machining directions which the milling tool 10 is configured for machining. To elaborate, during machining, the machining forces attempt to separate the cutting insert 18 away from the insert seat surface 36. By orienting the threaded bore 48, and consequently the screw 28 mounted therein, in the outward radial direction DO, the screw is placed under tension (but not significant shear which is far weaker structurally) and thereby significantly assists in maintaining the cutting insert 18 in contact with the insert seat surface 36.

While it is normally preferred for screws not to directly oppose cutting forces to the greatest extent possible (i.e. it is preferred for the rigid and integral support walls of an insert pocket to absorb what can be hundreds of kilograms of force) in this invention where multiple machining directions make slanting surfaces such as the insert seat surface and the support walls more complicated, this was a solution chosen.

It will be understood that while the invention can also be accomplished with embodiments not shown, for example a so-called dovetail arrangement comprising slanted pocket abutment surfaces and slanted insert abutment surfaces, or a top clamp, or a lever system etc., the preferred, tested, option is exemplified. More specifically, a top clamp can have inferior chip flow, and lever and dovetail arrangements requires a more expensive production process, yet these are still feasible options for the present invention for aspects not limited to the above-described threaded bore design.

When viewed in the counter-rotation direction, in a view facing the insert seat surface 36 (as shown in FIG. 4D), a second external bore angle a2 is defined between the schematically shown bore axis AB and an imaginary bore plane PB (for visibility purposes the bore axis AB direction is exaggerated, noting that in the second external bore angle a2 is very small and without exaggeration it would be hard to see the bore axis AB separate from the imaginary bore plane PB) extending through the center of the threaded bore 48 and perpendicular to the longitudinal axis AL, in the outward radial direction DO, The second external bore angle a2 fulfills the condition: $3°<a2<15°$, preferably $7°<a2<13°$.

The purpose of this slight angle, i.e., the second external bore angle a2, is to assist in bringing the cutting insert 18 into contact with all three sidewalls 38, as will further be described below.

To allow the screw 28 slight freedom to bend and allow the cutting insert 18 to reach said three sidewalls 38, the screw's relief section 54 (as well as the screw's neck portion 28D and spherical portion 28E) was developed.

The screw's relief section 54 has a relief section diameter 56 greater than an innermost diameter 58 of the threaded section 52 and is located closer to the insert seat surface 36 than the threaded section 52. Due to the enlarged diameter of the threaded bore 48 adjacent to the insert seat surface 36, the screw's head 28A (FIG. 1) is provided room to bend slightly to bias the cutting insert towards a desired side wall 38. More precisely, it is directed between a pair of adjacent side walls 38. In this example which uses a standard thread direction, the adjacent pair are the first (rear) and third (middle) support walls 38A, 38C.

Referring now to FIGS. 5A to 5H, the cutting insert 18 is single-sided with a positive basic shape and comprises a rake surface 60, a bottom surface 62 opposite the rake surface 60, an insert axis AI passing through the center of the rake and bottom surfaces 60, 62 (more precisely, extending perpendicular to the bottom surface 62), an insert bore 64 opening out to the rake and bottom surfaces 60, 62, a relief surface 66 and a cutting edge 68 (which in preferred embodiments extends around the entire intersection of the rake surface 60 and the relief surface 66 as exemplified).

It will be understood that the insert bore 64 is a non-limiting but preferred feature, for the reasons given above related to the threaded bore 48.

The rake surface 60 has a positive land 70 (FIG. 5H) extending adjacent to the cutting edge 68.

The relief surface 66 connects the rake surface 60 and the bottom surface 62 and converges inwardly from the rake surface 60 to the bottom surface 62. To elaborate, as shown in FIG. 5H, an exemplary portion 66A of the relief surface 66 tends in an insert inward direction DII which is towards the insert axis AI, as it extends from the rake surface 60 to the bottom surface 62.

Figures 5A, 5B:
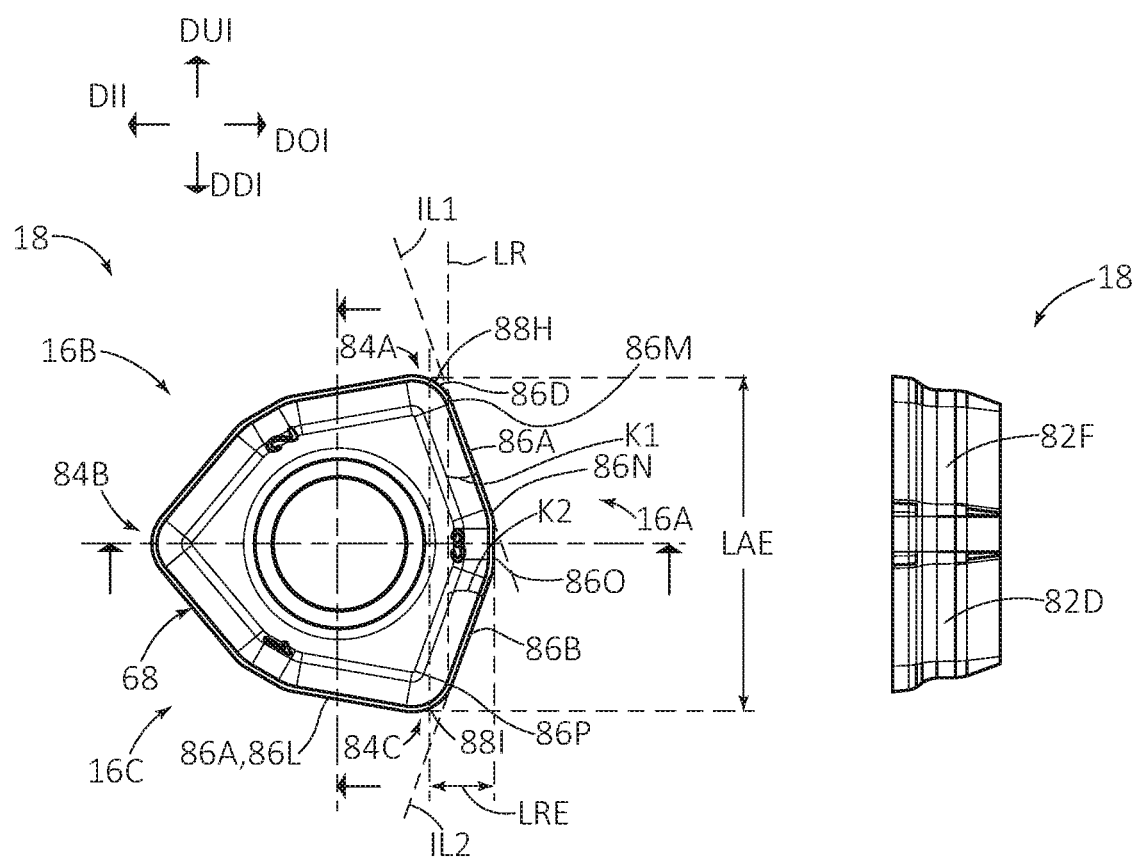
FIG. 5A is a top view of a milling insert of the milling tool in FIG. 1, facing the insert's rake surface.
FIG. 5B is a first side view of the milling insert in FIG. 5A.
Figure 5C:
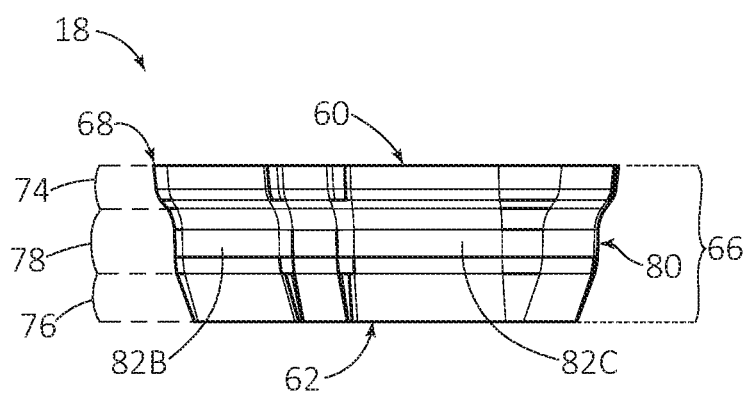
FIG. 5C is a second side view of the milling insert in FIG. 5A.

For the sake of completeness, for explanatory purposes, in FIG. 5A there is shown an insert downward direction DDI, an insert upward direction DUI, and an insert outward radial direction DOI. It will be understood that the insert directions are relative to which radial edge 16 is being referenced in a top view of the cutting insert, with the reference in FIG. 5A being the first radial edge 16A.

The bottom surface 62 comprises three safety recesses 72 (in this non-limiting but preferred embodiment of a three-way indexable cutting insert 18, there is a first safety recess 72A, a second safety recess 72B and a third safety recess 72C). Stated differently, the number of safety recesses 72 corresponds to the number of radial cutting edges 16 in an insert.

The relief surface 66 comprises an overhang portion 74, a relieved portion 76 recessed inwardly more than the overhang portion 74 towards the insert axis AI, and a support portion 78 extending between the overhang portion 74 and the relieved portion 76 and recessed inwardly more than the overhang portion 74 towards the insert axis AI. In this preferred yet non-limiting embodiment, the relieved portion 76 is recessed inwardly more than the support portion 78.

The overhang portion 74 is the closest portion to the rake surface 60. The overhang portion 74 is inwardly slanted (or "relieved") towards the bottom surface 62.

The relieved portion 76 is the closest portion to the bottom surface 62. The relieved portion 76 is inwardly slanted (or "relieved") towards the bottom surface 62.

The support portion 78 is located between the overhang portion 74 and the relieved portion 76. In this non-limiting but preferred embodiment, the support portion 78 (or at least a central portion 80 thereof) extends parallel to the insert axis AI. It will be understood that there is always a transition region between slanted and non-slanted surfaces.

Figure 5D:
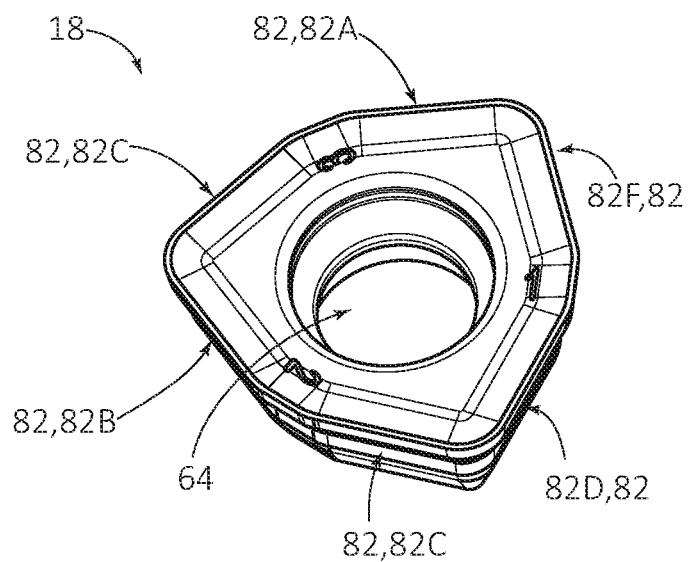
FIG. 5D is a perspective view of the milling insert in FIG. 5A.
Figure 5E:
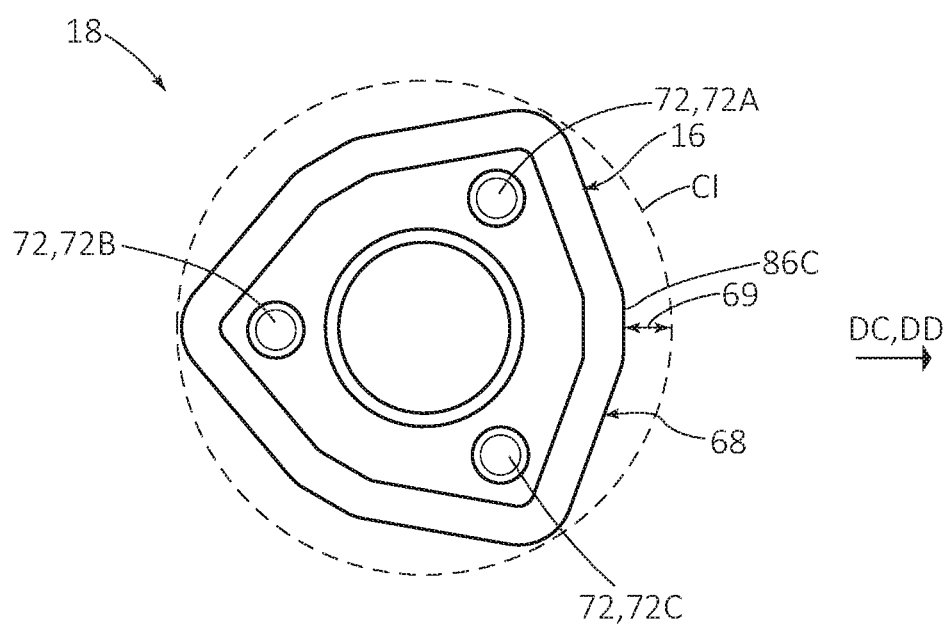
FIG. 5E is a bottom view of the milling insert in FIG. 5A.

The support portion 78 comprises a plurality of insert abutment surfaces 82 (as schematically shown in FIG. 5D, first, second, third, fourth, fifth and sixth insert abutment surfaces 82A, 82B, 82C, 82D, 82E, 82F). More precisely, the insert abutment surfaces 82 are comprised by the central portion 80 of the support portion 78.

The cutting edge 68 is formed along an intersection of the rake surface 60 and the relief surface 66 and, since the cutting insert 18 is three-way-indexable (or "120° rotationally-symmetric"), the cutting edge 68 comprises exactly three radial cutting edges 16 (namely, first, second and third radial edges 16A, 16B, 16C).

It will be understood that the invention could be carried out with a single radial cutting edge 16 (as with the integral embodiments in FIGS. 2 and 3), however for indexable inserts it is more cost efficient to have a plurality of radial cutting edges 16.

Features described below relating to the radial cutting edge 16 will be stated generally without reference to a particular radial cutting edge with it being understood that such features apply to each of the identical first, second and third radial edges 16A, 16B, 16C.

More precisely, each of the first, second and third radial edges 16A, 16B, 16C connect at a center of a radiused corner 84 (in this example there are first, second and third radiused corners 84A, 84B, 84C) of the cutting edge 68.

More precisely, referring now to FIG. 11A, each radial cutting edge 16 comprises a first sub-edge 86A, a second sub-edge 86B and a third sub-edge 86C. In FIG. 11A, the radial cutting edge 16 is oriented in the position it would assume in a solid end mill having its longitudinal axis AL oriented along the upward-downward directions DU, DD. Therefore, the first sub-edge 86A may therefore be referred to as the rear sub-edge 86A; the second sub-edge 86B may be referred to as the forward sub-edge 86B; and the third sub-edge 86C may be referred to as the middle sub-edge 86C.

Each first sub-edge 86A comprises an adjacent radiused edge 86D (not shown in FIG. 11A since it is taken from an integral tooth which is identical in all respects except for the upper corner, thus see FIG. 5A) which is a portion of an adjacent radiused corner 84 (in this example the first radiused corner 84A), and ends at a transition corner 86E with the third sub-edge 86C.

Each second sub-edge 86B comprises an adjacent radiused edge 86F which is a part of an adjacent radiused corner 84 (in this example the part is precisely half of the third radiused corner 84C in FIG. 5A), and ends at a transition corner 86G with the third sub-edge 86C.

More precisely, the first sub-edge 86A comprises a first radiused edge 86D (which is part, and more precisely half of the first radiused corner 84A) and extends to a first transition corner 86E. The third sub-edge 86C extends from the first transition corner 86E to a second transition corner 86G. The second sub-edge 86B extends from the second transition corner 86G and comprises a second radiused edge 86F (which is a part, and more precisely half of the third radiused corner 84C).

Below, the description relates both to the radial cutting edge 16 in FIG. 11A and of the first radial cutting edge 16A in FIG. 5A. It is understood that radial cutting edge 16A of FIG. 5A is also oriented in the position it would assume, if the cutting insert to which it belongs is seated in an insert mill holder having a longitudinal axis AL oriented along the upward-downward directions DU, DD.

The first radial cutting edge 16, 16A has an axial edge length LAE and a radial edge length LRE measurable perpendicular thereto.

In the example of a cutting insert 18, the axial edge length LAE is measurable perpendicular to the insert axis AI and extends from the outermost extremities 88 of the first (rear) and second (forward) sub-edges 86A, 86B (herein also called the uppermost extremity 88H and the lowermost extremity 88I).

Alternatively, for a milling tool (which may or may not have cutting inserts), as shown in the milling tool 10 in FIG. 6A, the axial edge length LAE can be measured parallel with the tool's longitudinal axis AL, and the radial edge length LRE can be measured perpendicular to the longitudinal axis AL.

Since the function of the cutting edge (whether on a cutting insert or a tooth) is related to the direction of machining, the following lengths and angles will be mostly described relative to the radial cutting edge of a milling tool, but will be understood to be similarly measurable relative to a cutting insert, mutatis mutandis.

The first (rear) sub-edge 86A has a first longitudinal length L1 and a first radial length R1.

The second (forward) sub-edge 86B is located downwardly of the first sub-edge 86A and has a second longitudinal length L2 and a second radial length R2.

The third (middle) sub-edge 86C has a third longitudinal length L3 and a third radial length R3.

The third longitudinal length L3 is shorter than both the first longitudinal length L1 and the second longitudinal length L2.

For the sake of completeness, referring to FIG. 6A: the first (rear) sub-edge 86A extends towards the third (middle) sub-edge 86C in the downward and outward directions DD, DO; the second (forward) sub-edge 86B extends towards the third (middle) sub-edge 86C in the upward and outward directions DU, DO; and the third (middle) sub-edge 86C extends basically parallel with the longitudinal axis AL.

Figure 5F:
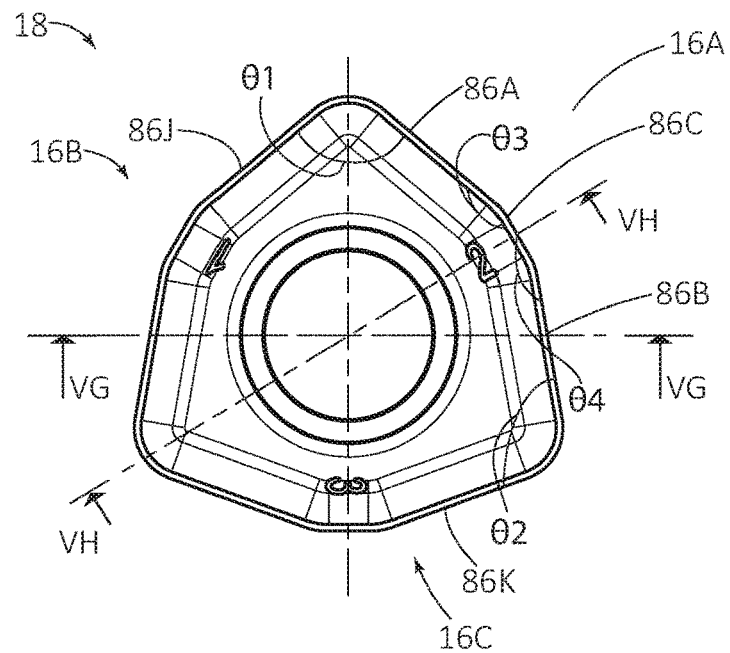
FIG. 5F is another top view of the milling insert identical to FIG. 5A, albeit rotated.
Figure 5G:
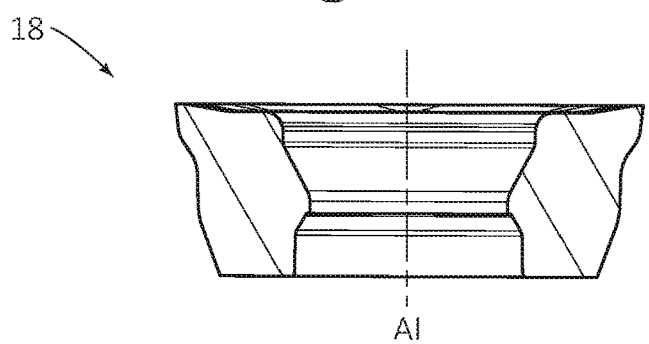
FIG. 5G is a section view along line VG-VG in FIG. 5F.
Figure 5H:
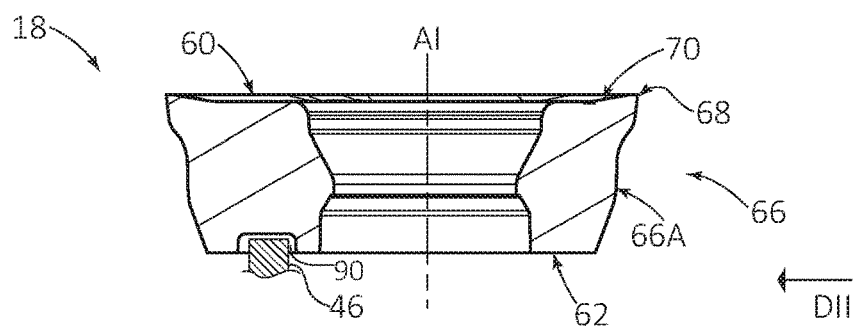
FIG. 5H is a section view along line VH-VH in FIG. 5F, further schematically showing a safety projection of the insert seat (shown in FIG. 4A)

Referring now to FIG. 5F for convenience, a first internal angle θ1 between the first sub-edge 86A of the first radial edge 16A and a second sub-edge 86J of the second radial edge 16B (i.e. a main cutting sub-edge which is adjacent thereto) fulfills the condition: 90°<θ1<110°.

A second internal angle θ2 between the second sub-edge 86B of the first radial edge 16A and a first sub-edge 86K of the third radial edge 16C (i.e. a main cutting sub-edge which is adjacent thereto) fulfills the condition: 90°<θ2<110°.

In the present example (which uses an indexable insert, the first and second internal angles θ1, θ2 are equal.

A third internal angle θ3 between the third sub-edge 86C and the first sub-edge 86A fulfills the condition: 130°<θ3<150°.

A fourth internal angle θ4 between the third sub-edge 86C and the second sub-edge 86B fulfills the condition: 130°<θ4<150°.

In the example shown the third and fourth internal angles θ3, θ4 are equal, however there may be reasons to make them unequal. For example, the milling tool may work harder when machining in the upward or downward direction, justifying a difference Δ in angles. The difference Δ, however, preferably a small difference to still allow high-feed in both directions. Accordingly, preferably, the difference Δ fulfills the condition: 0°<Δ<15°, more preferably 0°<Δ<5°.

The radial cutting edge 16 further comprises a fourth sub-edge 86L. In examples where the radial cutting edge 16 is formed on a cutting insert 18, the fourth sub-edge 86L can be a sub-edge of a different radial cutting edge. To elaborate, in FIG. 5A, if the first radial cutting edge 16A is considered as an active cutting edge, the fourth sub-edge 86L thereof is also the first cutting sub-edge 86A of the third radial cutting edge 16C. This can be contrasted with the fourth sub-edge 86L shown in FIGS. 8A and 11A.

Referring to FIG. 6A, the fourth sub-edge 86L extends from the second (forward) sub-edge 86B in both the inward radial and upward directions DI, DU. Additionally, the fourth sub-edge 86L comprises half of the third radiused corner 84C.

Said extension of the preferred, exemplified, fourth sub-edge 86L in both the inward radial and upward directions DI, DU allows a ramping function, but a fourth sub-edge (more generally speaking, an "axial cutting edge"; i.e. the radial cutting edge extends along a radial side of a milling tool and an axial cutting edge extends along an axial or end side of a milling tool) could have a different shape for a different operation, if desired.

Figure 6C:
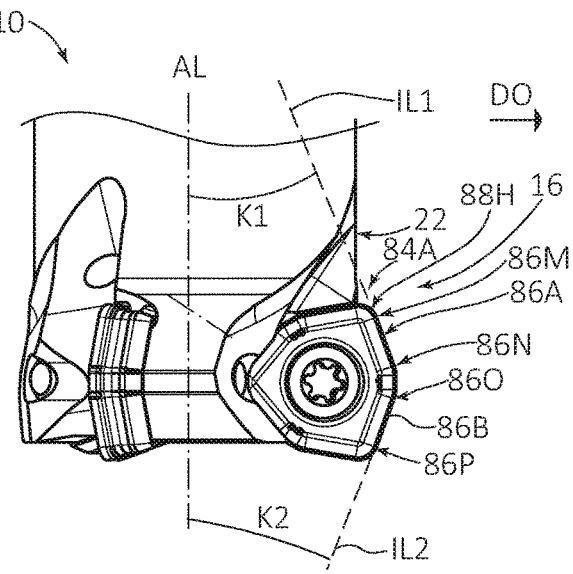
FIG. 6C is a side view of the cutting portion in FIG. 1, with the milling insert at the lower right side of the drawing having the same top view orientation as the milling insert in FIG. 5A, the top view facing the insert's rake surface.

Referring to FIG. 6C, the first (rear) sub-edge 86A comprises a first uppermost point 86M and a first lowermost point 86N.

First and second sub-edges angles k1, k2 will now be discussed. For the purpose of determining their value, the radiused edges (e.g. the first radiused edge 86D and the second radiused edge 86F) should not be considered. Thus, for example, the first uppermost point 86M is not equivalent to the uppermost extremity 88H.

A first imaginary line IL1 is defined as extending through the first uppermost point 86M and a first lowermost point 86N.

A first (rear) sub-edge angle k1 is formed between the first imaginary line IL1 and the longitudinal axis AL.

A more traditional way to show this angle is by drawing a line perpendicular to the longitudinal axis AL yet shifted to coincide with the basic position of the third (middle) sub-edge 86C. However, since both methods result in an identical angle value, the above way is used, inter alia, for convenience.

The second (forward) sub-edge 86B comprises a second uppermost point 86O and a second lowermost point 86P, with a second imaginary line IL2 defined thereby.

A second (forward) sub-edge angle k2 is formed between the second imaginary line IL2 and the longitudinal axis AL.

Referring now to FIG. 5A, alternatively, to calculate the first and second sub-edge angles k1, k2 with a cutting insert 18 alone, i.e. instead of using the longitudinal axis AL, a reference line LR extending through said extremity points 86M, 86N or 86O, 86P can be defined in the same manner and used for the determination.

In the present example of the above-described milling tool: μ1=10°; μ2=50°; μ3=50°; μ1=140°; μ2=100°; a1=80°; a2=10°; θ1=100°; θ2=100°; θ3=140°; θ4=140°; Δ=0°; k1=20°; k2=20°; L1=3.2 mm; L2=3.2 mm; L3=1.1 mm; R1=1.1 mm; R2=1.1 mm; R3=1.1 mm.

It will be understood that the angles above are designed to facilitate high-feed milling.

Referring to FIG. 5E, an alternative definition of the general shape of a radial edge in accordance with the present invention will be described.

An imaginary circumscribing circle CI of the cutting edge 68 is provided (the bottom view of the cutting insert 18 is merely being used for convenience).

A cutting direction DC is defined as the basic direction which the radial cutting edge 16 faces. The cutting direction DC is also equivalent to the outward radial direction DO mentioned above, and thus is perpendicular to the insert mill holder's longitudinal axis AL, when the insert is seated.

The forwardmost portion of the cutting edge 68 in the cutting direction DC, i.e. the third (middle) sub-edge 86C, is recessed inward a distance 69 of the imaginary circumscribing circle CI.

It will be understood that, particularly with solid end mills, there are spherical-shaped or other-shaped cutting portions in which the corresponding edge to the third sub-edge extends to the imaginary circumscribing circle CI or even projects outward therefrom. This allows a larger cutting edge to be operative in those tools. However the present invention which is designed for high feed machining would be required to operate with a slower feed rate with such large projections, since the cutting edge would necessarily require a larger chip to be machined (at least when moving in the upward direction or downward direction. Stated differently yet, the cutting portion of a milling tool of the present invention can be elongated in a direction parallel with the longitudinal axis AL (this is different to known chamfer tools which are elongated more in a direction perpendicular to their longitudinal axis than parallel thereto).

Notwithstanding the abovesaid, it will be understood that angles which are larger than the above defined first and second sub-edge angles k1, k2 (or at least larger than the more preferred values thereof) and hence suited for moderate feed (instead of high feed), also fall within the scope of the present invention in relation to the claimed method of machining, which is believed to be novel regardless of the specific cutting edge features. Similarly, the milling tool and insert mill aspects with their unique insert pocket configuration to support a cutting insert for both the upward and downward directions is believed to be novel regardless of the specific cutting edge features.

Referring also to FIGS. 6A to 6D, assembly of the milling tool 10 will be described.

The cutting insert 18 is placed in one of the insert pockets 26 such that the insert's bottom surface 62 abuts the insert seat surface 36.

The threaded screw shank 28B is extended through the insert bore 64 and partially threaded (in a clockwise rotation direction) into the threaded bore 48. Due to the second external bore angle a2 the screw head 28A biases both the first insert abutment surface 82A into abutment with the first (rear) support wall 38A and the third insert abutment surface 82C into abutment with the third (middle) support wall 38C.

Normally with rigid bodies, such as the cutting insert (typically made of cemented carbide) and the solidly constructed insert seat (the insert mill being typically made of steel), the cutting insert is not allowed to truly come into contact with three lateral abutment surfaces simultaneously (in addition to the insert seat surface), hence there is no initial contact between the second insert abutment surface 82B and the second (forward) support wall 38B.

Subsequently, the screw 28 is tightened/completely fastened with the final twist bringing the second insert abutment surface 82B into abutment with the second (forward) support wall 38B.

It will be understood that this could also be accomplished with initial contact of the insert with the second and third support walls and counterclockwise rotation of the screw. However, this would require a non-standard screw and bore threading, which, while feasible, is not necessary for the present invention.

Additionally, as mentioned above, various modifications were made to the insert bore 64 and screw 28 to assist in ensuring contact of three lateral pocket surfaces. For example, the bore axis AB and the imaginary bore plane PB are angled at the second external bore angle a2, and a novel relief section 54 was added to ensure enough play is provided to reach said abutment positions.

Additionally, to assist with the unique machining directions and forces, the screw bore 48 is angled, as mentioned above, at the first external bore angle a1. This angle strengthens the connection of the insert 18 to the insert pocket 26 and ensuring enhanced support in machining in each of the downward, outward (i.e., lateral) and upward directions DD, DO, DU.

The safety recess 72 accommodates the safety projection 46, leaving a gap 90 (FIG. 5H) all around the safety projection 46. This allows an extra precaution in case the insert 18 moves out of place. It will be understood that if said gap 90 would not be provided, unintended initial contact between the safety projection 46 and the safety recess 72 when mounting the insert 18 could likely prevent the above-described contact with three lateral surfaces (i.e. the first support wall 38A, second support wall 38B and third support wall 38C).

Figure 6B:
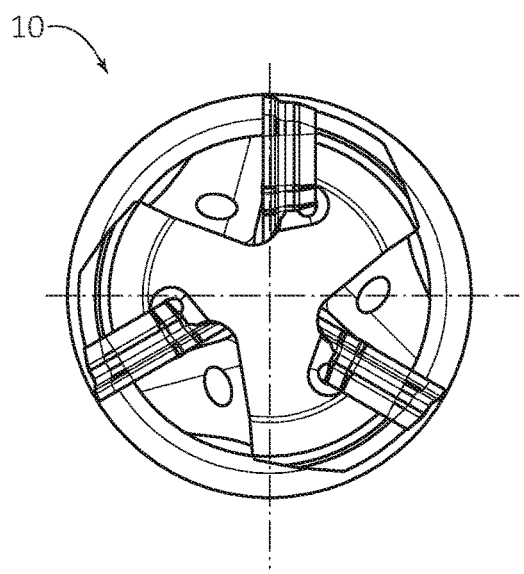
FIG. 6B is a bottom view of the cutting portion in FIG. 6A.
Figure 6D:
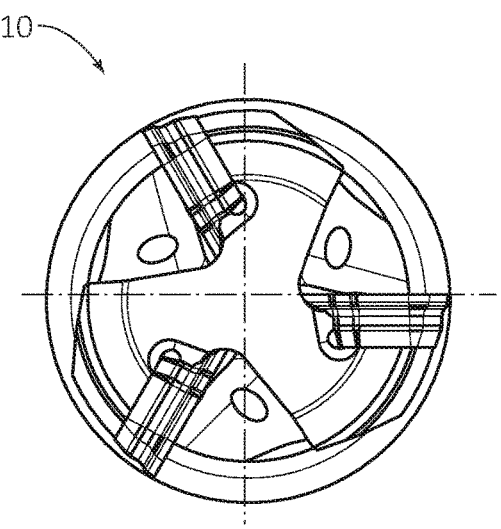
FIG. 6D is a bottom view of the cutting portion in FIG. 6C.

Attention is drawn to FIGS. 6A and 6B, a side view of the cutting edge 16 of the insert 18 is seen being parallel with the longitudinal axis AL. Due to the nature of the milling tool 10, namely configured to machining in both the upward and downward directions DU, DD, this neutral position of the insert 18 is preferred to avoid undesired chips clogging the milling tool 10 when moving in either the upward and downward directions DU, DD (as may be the case if the insert 18 is positively or negatively slanted, as is typically the case with most insert mills).

Referring to FIGS. 7A to 7D, the milling tool 10 is illustrated in machining operations on an internal wall 100 of a workpiece 102, i.e. within a pre-existing so-called cavity 104.

The milling method can be pre-programmed on a computer program of a computer numerical control lathe (i.e. a CNC machine (not shown); however this term extends to a machining center or any similar machine for milling).

Figure 7A:
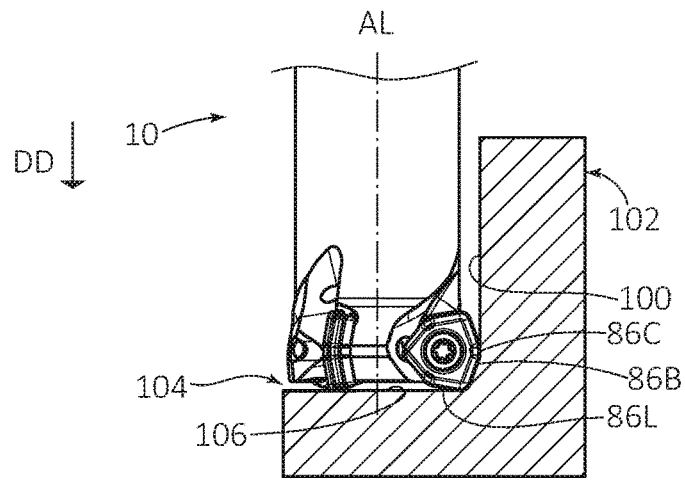
FIG. 7A is a side view of the milling tool in FIG. 1, milling a workpiece in a downward direction.
Figure 7B:
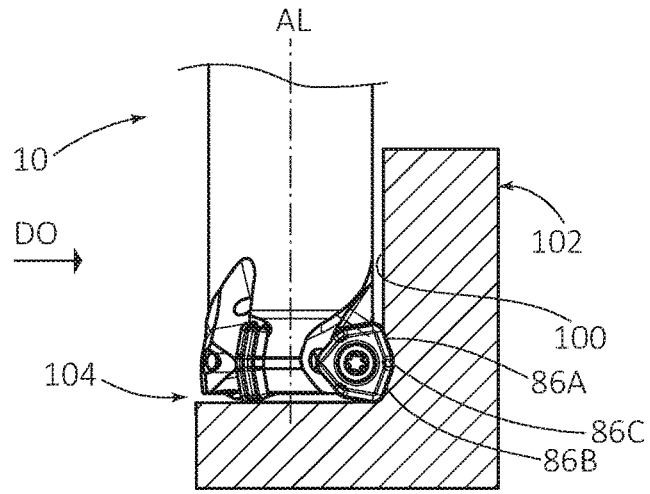
FIG. 7B is a side view of the milling tool and workpiece in FIG. 7A, milling the workpiece in an outward radial direction.
Figure 7C:
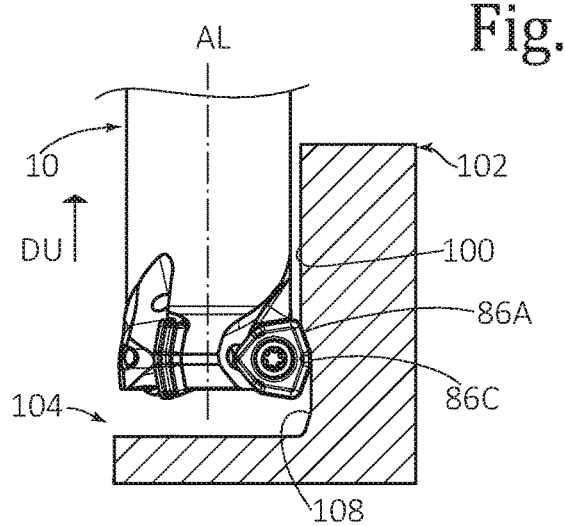
FIG. 7C is a side view of the milling tool and workpiece in FIG. 7A, milling the workpiece in an upward direction.
Figure 7D:
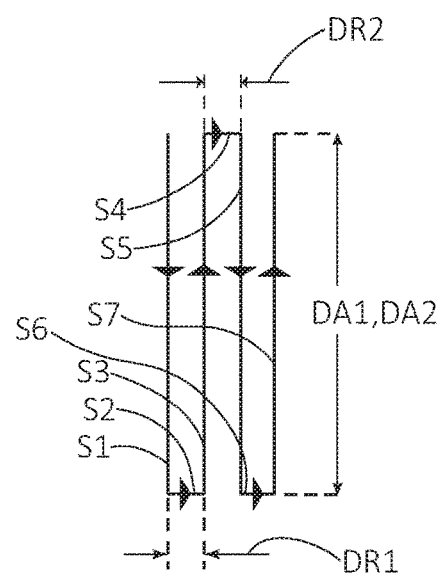
FIG. 7D is a schematic representation of a milling operation or pattern.

Referring to FIGS. 7A and 7D, a first step (schematically indicated as "S1" in FIG. 7D) of the machining operation is shown. The first step S1 is the milling tool 10 machining the internal wall 100 in the downward direction DD, for a first axial distance DA1 measurable parallel to the longitudinal axis AL. While the milling tool 10 is capable of continuing to machine into a floor 106 of the cavity, in this instance it stops beforehand.

It will be understood that the first axial distance DA1 is only limited by the length of the cutting portion 14, until the point where it is no longer relieved from the radial cutting edge 16.

In the first step S1, since the second (forward) sub-edge 86B primarily machines the material (the third (middle) sub-edge 86C not removing any significant material), only the second (forward) sub-edge 86B is applying a machining force on the workpiece 102, and said force is transferred to the opposing first (rear) and third (middle) support walls 38A, 38C which primarily support the cutting insert 18, with the second (forward) support wall 38B not providing a significant support.

Referring to FIGS. 7B and 7D, a second step S2 in the machining operation is shown. The second step S2 is the milling tool machining the internal wall 100 in the outward radial (lateral) direction DO for a first radial distance DR1 measurable perpendicular to the longitudinal axis AL. In the second step S2, the entire radial edge 16, i.e. each of the first, second and third sub-edges 86A, 86B, 86C machines the material. Accordingly, each of the first, second and third support walls 38A, 38B, 38C primarily support the cutting insert 18.

Preferably, the first radial distance DR1 is equivalent to the depth of the first (rear) sub-edge 86A and the second (forward) sub-edge 86B, i.e. until the reference line LR (FIG. 5A), but also can be as deep as the adjacent radiused edges 86D, 86F. Similarly, the first radial distance DR1 is limited by the radial projection of the radial cutting edge 16 compared to the radial peripheral surface 22.

Referring to FIGS. 7C and 7D, a third step S3 in the machining operation is shown. The third step S3 is the milling tool 10 machining the internal wall 100 in the upward direction DU for a second axial distance DA2 measurable parallel to the longitudinal axis AL. In the third step S3, the first (rear) sub-edge 86A primarily machines the material. Since the first (rear) sub-edge 86A is primarily applying machining force on the workpiece, the second (forward) support wall 38B primarily supports (with, perhaps a small amount of assistance from the third (middle) support wall 38C) the cutting insert 18.

It will be understood that the first axial distance DA2 is similarly only limited by the length of the cutting portion 14 which is relieved from the radial cutting edge 16.

As shown, after the milling tool 10 moved in the upward direction DU, the internal wall 100 is left with a wall corner 108 corresponding basically to the shape and orientation of the second sub-edge 86B.

In all of the machining directions, the screw 28 is in tension and assists in maintaining the cutting insert 18 in abutment with the insert seat surface 36.

Referring to FIG. 7D, it will be understood that the above-described steps can be repeated. For example, the third step S3, can be followed with another second step S4 in the outward radial direction DO similar to the second step S2 (and machining a second radial distance DR2 which is identical to the first radial distance DR1), except located at the top of the workpiece 102.

This pattern can be repeated, for example with a further downward machining step S5, a subsequent outward radial machining step S6, and a subsequent upward machining step S7, and so forth, etc.

It will be understood that while this is considered a novel work pattern, it does not mean that alternative machining steps are excluded from the inventive milling tool or further being part of a milling pattern thereof.

For example, said milling pattern could alternatively start from the bottom of the cavity 104 and hence the method may start with said outward (lateral) second step S2, immediately followed by the third step S3 in the upward direction, which is then immediately followed, for example, by another outward (lateral) second step S4, and which can be immediately followed by a downward step S5.

It will be understood, the pattern could start at any step shown in FIG. 7D.

According to any pattern, the steps can be repeated.

It is evident from the above, that by milling both during the "downstroke", "sidestroke" and the "upstroke", cutting efficiencies may be realized. In some embodiments, the speed of the milling tool relative to the workpiece may be the same in the downstroke and the upstroke.

Software instructions may be provided to a CNC milling machine to execute the sequence of steps described above. Traditionally, such machines were not configured to perform the pattern shown in FIG. 7D. In part, this is because conventional computer aided manufacturing (CAM) programs, which translate a CAD design for a part in the form of, e.g., a vector file, into G-code or other language suitable for the target CNC milling machine, do not contemplate the possibility of milling in the above-three strokes in a continuous pattern. The present invention contemplates a CAM program comprising software in a non-transient memory which allows for milling a workpiece as the tool is being retracted in the upward direction along its longitudinal axis, and therefore is configured to generate G-code or the like to implement milling on the upstroke. The present invention also contemplates a CNC milling machine configured to carry out at least the sequence of steps S1, S2, S3 described above. Such a CNC milling machine would have a non-transient memory storing instructions which, when executed, carries out the aforementioned steps S1, S2, S3, and optionally follows with steps S4, S5, S6 and S7.

The above-description includes a pre-existing cavity 104, for the sake of simplicity. It will be understood that such milling tool 10 could also create a cavity by using the fourth sub-edge 86L, for example, with the first step being a downward helical interpolation operation.

Alternatively, the fourth sub-edge 86L could perform a ramping operation (an example of which is illustrated in U.S. Pat. No. 9,636,758, particularly regarding FIG. 4C).

Of particular note is that the milling tool 10, 10', 10" of the present invention is particularly versatile and is capable of a wide range of milling operations. To elaborate, the milling tool 10 capable of down plunging (as shown in FIG. 7A; i.e. milling the workpiece in the downward direction such that there is only rotation of the at least one radial cutting edge about the longitudinal axis and translation of the radial cutting edge in only the downward direction), side plunging (as shown in FIG. 7B; i.e. milling the workpiece in the outward radial direction such that there is only rotation of the at least one radial cutting edge about the longitudinal axis and translation of the radial cutting edge in only the outward radial direction), up plunging (as shown in FIG. 7C; i.e. milling the workpiece in the upward direction such that there is only rotation of the at least one radial cutting edge about the longitudinal axis and translation of the radial cutting edge in only the upward direction), slotting, ramp down, helical interpolation, lower chamfer, upper chamfer, shouldering while descending and shouldering while ascending.

Referring to FIG. 6B, it will be understood that to carry out the up plunging operation shown in FIG. 7C, the entire insert mill 10 above the radial cutting edge 16 needs to be relieved. Stated differently, the uppermost extremity 88H of the radial cutting edge 16 projects further in the outward radial direction DO than the radial peripheral surface 22 of the insert mill at all points above it. More precisely, the majority of the first (uppermost) corner 84A projects further in the outward radial direction DO than the radial peripheral surface 22.

The milling tool 10 according to the present invention has been found to be preferable for relatively large depth milling. Thus, the distance milled in the first step may advantageously fulfill the condition: DA1>LAE, preferably DA1>2LAE and more preferably DA1>4LAE. Similarly, the distance milled in the third step may advantageously fulfil the condition: DA2>LAE, preferably DA2>2LAE and more preferably DA2>4LAE.

Conversely, in line with the high feed machining in which only small chips are removed, in the outward radial direction (e.g. the second step S2, or any similar step) the distance milled is preferably small, preferably fulfilling the condition: DR1<LRE, preferably DR1<0.8LRE.

Some alternative features and embodiments will now be discussed.

Figure 8A:
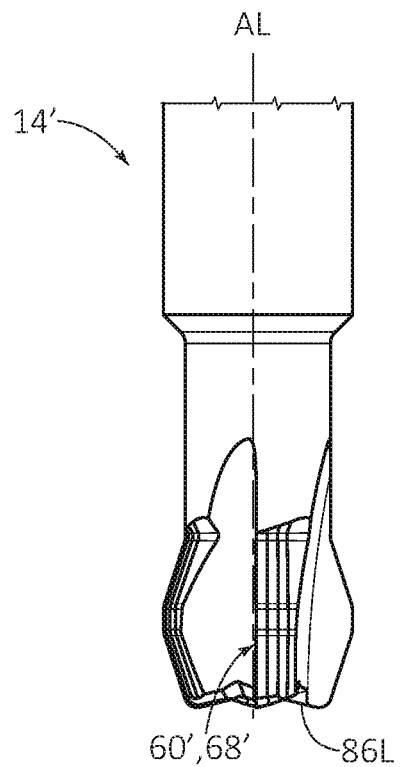
FIG. 8A is a side view of a portion of the milling tool in FIG. 2.
Figure 8B:
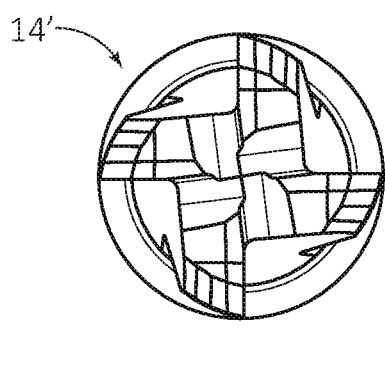
FIG. 8B is a bottom view of the milling tool in FIG. 8A.

Referring to FIGS. 8A and 8B, a cutting portion 14' of the solid endmill 10' in FIG. 2 is shown from a side view of a rake surface 60' and cutting edge 68' in the center of FIG. 8A. The rake surfaces 60' and cutting edges 68' extend parallel to the longitudinal axis AL.

As noted above, this is currently the preferred orientation rather than positively or negatively sloped rake surfaces for chip evacuation or chip curling purposes due to the upward and downward motion for machining.

Figure 9:
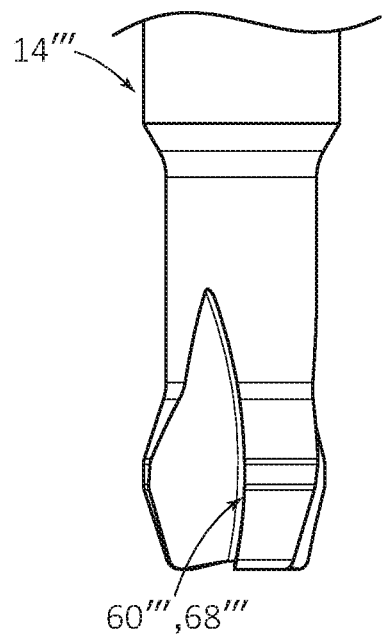
FIG. 9 is a side view (facing a relief surface) of another milling tool similar to the view and construction of the milling tool in FIG. 8A, except for a concavely curved cutting edge and rake surface visible near the center of the drawing.

Referring to FIG. 9, one possible option is shown. Illustrated is a solid endmill 14''' similar to that shown in FIG. 8A except that the rake face 60''' and cutting edge 68''' are both concavely curved. The curvature being symmetric in both the upward and downward directions from the third (middle) sub-edge. This allows, in theory, a chip evacuation effect by deflecting chips in a direction opposite to the direction of the milling (for both the upward and downward directions).

Despite the advantages, the embodiment in FIG. 9 is a more complex construction, hence the straight longitudinal edge, as exemplified in FIG. 8A, is advantageous in lowering costs of manufacturing.

Figure 12:
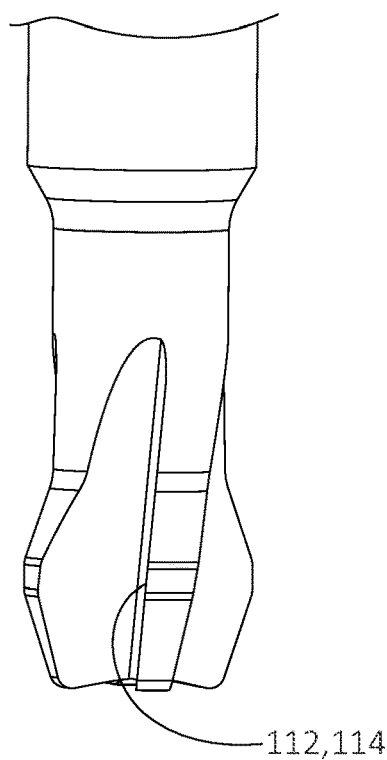
FIG. 12 is a side view (facing a relief surface) of another milling tool similar to the view and construction of the milling tools in FIGS. 8A and 9, except for a straight positively-sloped curved cutting edge and rake surface visible near the center of the drawing.

Nonetheless, as shown in FIG. 12, there is illustrated is a solid endmill 110 showing one feasible embodiment is to positively slope each cutting edge 112 and rake surface 114. This may be done, for example, to assist chip evacuation upwardly.

Figure 13:
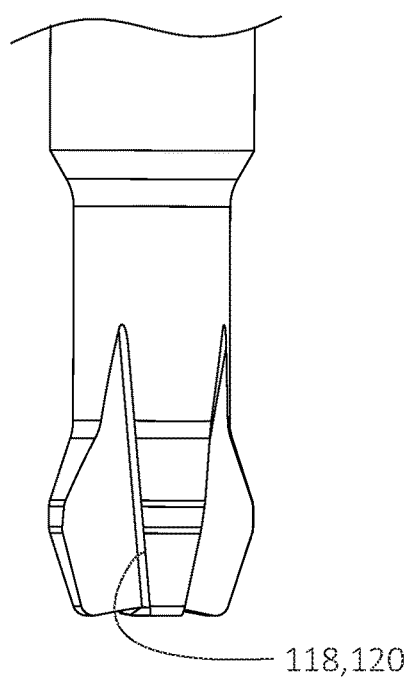
FIG. 13 is a side view (facing a relief surface) of another milling tool similar to the view and construction of the milling tools in FIGS. 8A, 9 and 12, except for a straight positively-sloped curved cutting edge and rake surface visible near the center of the drawing.

Similarly, in FIG. 13, there is illustrated is a solid endmill 116 showing one feasible embodiment is to negatively slope each cutting edge 118 and rake surface 120.

Figure 10:
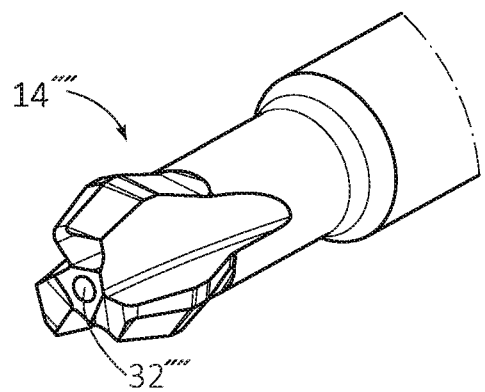
FIG. 10 is a perspective view of another milling tool similar to the view and construction of the milling tool of FIG. 8A, further comprising a coolant construction.

Referring to FIG. 10, illustrated is another cutting portion 14'''' according to the present invention, similar to that shown in FIGS. 2, 8A and 8B, further comprising a coolant arrangement (only shown by a coolant outlet 32''''). The coolant arrangement preferably comprises an upwardly located coolant inlet (not shown), a downwardly located coolant outlet 32'''' and a coolant channel (not shown, yet preferably straight) extending therebetween.

In the embodiment disclosed in FIG. 10, the coolant outlet 32'''' is downwardly facing and opening out to the bottom end of the endmill in a symmetrical manner. It will be understood that such a coolant arrangement is not limited to a solid endmill, and that all embodiments of the present invention, such as the insert-mill and the replaceable milling head, may have such an arrangement. It will also be understood that while in the example shown in FIG. 10 there is a single coolant outlet located symmetrically about the milling tool, such an arrangement may include a plurality of coolant outlets, which may not be symmetric, and may not be downward facing.

Referring to FIG. 11A, illustrated is a schematic view of the radial edge 16, as explained above. Notably, the first, second, third and fourth sub-edges 86A, 86B, 86C, 86L are straight. More specifically, the third (middle) sub-edge 86C is straight, in theory constituting a wiper when milling in the upward and downward directions.

It will be added that for 5-axis machines, or similar CNC machines, such milling tool could be angled and, for example, the straight second (forward) sub-edge 86B could be advantageously used for a finish operation.

For the comparison below, to reiterate briefly, in FIG. 11A the radial cutting edge 16 comprises the first (rear) sub-edge 86A, the second (forward) sub-edge 86B and the third (middle) sub-edge 86C. The first (rear) sub-edge 86A extends to the first transition corner 86E. The third (middle) sub-edge 86C extends in the downward direction DD from the first transition corner 86E to the second transition corner 86G. The second (forward) sub-edge 86B extends from the second transition corner 86G.

By contrast, referring to FIG. 11B, illustrated is a schematic view of a radial edge 16D, similar to the schematic of FIG. 11A, except for a concavely curved third (middle) sub-edge 86C'. More precisely, the first and second transition corners 86E', 86G' are convexly-curved, albeit smaller than the concave curvature of the larger third sub-edge 86C'. Such a cutting edge design allows for a complete separation between the areas of the cutting edge that are machining the workpiece, theoretically extending the insert life and allowing for better heat dissipation.

Referring to FIG. 11C, illustrated is a schematic view of a radial edge 16E, similar to the previous cutting edge designs, except for a convexly-curved third sub-edge 86C". Such a cutting design retains the same first and second transition corners 86E", 86G" as FIG. 11A and continues tangentially to the convexly-curved third sub-edge 86C", allowing a stronger third sub-edge 86C" and a slightly increased depth of cut along the outward radial direction (however this may result in further wear of the third sub-edge which will be more strongly immersed in material in the upward and downward machining operations).

Referring to FIG. 11D, illustrated is a schematic view of a radial edge 16F, similar to the previous cutting edge designs, except that the convex curvature of the third sub-edge 86C''' is less than (i.e. closer to approaching a straight line) the convex curvature of the first and second transition corners 86E''', 86G''', thereby mitigating said possible wear mentioned in the previous paragraph.

Other embodiments of the present invention may include the first and second sub-edges being convexly or concavely curved, in a view facing the rake surface (not shown), or being of unequal lengths.

What is claimed is:

1. A milling tool having a tool rotation direction and a tool counter-rotation direction opposite thereto, the milling tool comprising:
   an elongated shank portion and a cutting portion connected to the shank portion;
   the shank portion defining:
     a longitudinal axis (AL) which defines a downward direction (DD) from the shank portion to the cutting portion and an upward direction (DU) opposite to the downward direction; and
     an outward radial direction (DO) perpendicular to the longitudinal axis and outward from the milling tool, and an inward radial direction (DI) opposite to the outward radial direction; and
   the cutting portion comprising:
     a rake surface;
     a relief surface; and
     a cutting edge formed along an intersection of the rake surface and the relief surface, the cutting edge comprising a radial cutting edge having an axial edge length LAE measurable parallel to the longitudinal axis (AL) and a radial edge length LRE measureable perpendicular to the longitudinal axis (AL);
   wherein, in a top view facing the rake surface, the radial cutting edge comprises:
     a first sub-edge having a first longitudinal length L1 and a first radial length R1, a first uppermost point and a first lowermost point which define a first imaginary line (IL1), and a first sub-edge angle k1 formed between the first imaginary line (IL1) and the longitudinal axis (AL);
     a second sub-edge located downwardly of the first sub-edge and having a second longitudinal length L2 and a second radial length R2, a second uppermost point and a second lowermost point which define a second imaginary line (IL2), and a second sub-edge angle k2 formed between the second imaginary line (IL2) and the longitudinal axis (AL); and
     a third sub-edge connecting the first and second sub-edges and having a third longitudinal length L3 and a third radial length R3;
   wherein:
     the first sub-edge extends towards the third sub-edge in the downward (DD) and outward (DO) radial directions;
     the second sub-edge extends towards the third sub-edge in the upward (DU) and outward (DO) radial directions; and
     in said top view facing the rake surface, the first sub-edge angle k1 fulfills the condition $12° < k1 < 25°$ and/or the second sub-edge angle k2 fulfills the condition $12° < k2 < 25°$.

2. The milling tool according to claim 1, wherein: the first sub-edge angle k1 fulfills the condition: $15° < k1 < 22°$ and/or the second sub-edge angle k2 fulfills the condition: $15° < k2 < 22°$.

3. The milling tool according to claim 1, wherein:
   the milling tool is an insert-mill holder;
   the cutting portion comprises at least one insert pocket having an insert seat surface and first, second and third support walls; and
   said rake surface, said relief surface and said cutting edge all belong to a cutting insert mounted in the at least one insert pocket, the cutting insert further comprising:
     a bottom surface opposite the rake surface; and
     an insert axis passing through the center of the rake surface and bottom surface, the insert axis defining an upward insert direction and a downward insert direction opposite to the upward insert direction;
   wherein:
     the relief surface connects the rake surface to the bottom surface, and comprises a support portion having first, second and third insert abutment surfaces.

4. The milling tool according to claim 3, wherein the cutting insert is mounted to the insert pocket with:
   the insert's bottom surface abutting the insert seat surface;
   the first insert abutment surface abutting the first support wall;
   the second insert abutment surface abutting the second support wall; and the third insert abutment surface abutting the third support wall.

5. The milling tool according to claim 3, wherein:
the cutting insert's bottom surface is formed with at least one safety recess;
the insert pocket's insert seat surface comprises a safety projection; and
the at least one safety recess accommodates the safety projection, with a gap remaining all around the safety projection.

6. The milling tool according to claim 3, wherein a majority of an uppermost corner, to which the radial cutting edge is connected, projects further in the outward direction than the radial peripheral surface along the cutting portion of the insert-mill holder.

7. The milling tool according to claim 3, wherein a majority of a lowermost corner, to which the radial cutting edge is connected, projects further in the outward direction than the radial peripheral surface along the cutting portion of the insert-mill holder.

8. The milling tool according to claim 3, wherein an uppermost corner and lowermost corner are connected to the radial cutting edge, and the uppermost corner is located precisely in the upward direction above the lowermost corner.

9. The milling tool according to claim 3, wherein cutting insert is clamped to the insert pocket only via a screw passing through the cutting insert.

10. The milling tool according to claim 3, wherein:
the insert pocket comprises an insert seat surface and a threaded bore opening out to the insert seat surface, the threaded bore having a bore axis; and
the bore axis forms a first external bore angle a1 with the insert seat surface in the outward radial direction, the first external bore angle a1 fulfilling the condition: $72° < a1 < 88°$.

11. The milling tool according to claim 10, wherein, in a view of the insert seat surface:
the bore axis forms a second external bore angle a2 with an imaginary bore plane (PB) extending through the center of the bore in the outward radial direction, the second external bore angle a2 fulfilling the condition: $3° < a2 < 15°$.

12. The milling tool according to claim 10, wherein the threaded bore comprises a threaded section and a relief section having a greater diameter than the threaded section, the relief section being closer than the threaded section to the insert seat surface.

13. The milling tool according to claim 3, wherein:
the first support wall extends in both the inward radial and downward directions;
the second support wall extends in both the outward radial and downward directions; and
the third support wall, located downwardly of the first support wall and upwardly of the second support wall, extends non-parallel relative to the first support wall and the second support wall.

14. The milling tool according to claim 3, wherein a first external angle β1 is formed between the first support wall and the third support wall and fulfills the condition: $130° < β1 < 150°$.

15. The milling tool according to claim 3, wherein a second external angle β2 is formed between the second support wall and the third support wall and fulfills the condition: $80° < β2 < 120°$.

16. The milling tool according to claim 1, further comprising a fourth sub-edge extending from the second sub-edge in the inward radial direction.

17. The milling tool according to claim 16, wherein the fourth sub-edge extends from the second sub-edge in both the inward radial and upward directions.

18. The milling tool according to claim 1, wherein, in a view facing the relief surface, at least one of the first sub-edge and the second sub-edge is straight.

19. The milling tool according to claim 1, wherein the third longitudinal length L3 is shorter than both the first longitudinal length L1 and the second longitudinal length L2.

20. The milling tool according to claim 3, wherein the cutting insert has a non-circular shape, and is three-way indexable about the insert axis.

* * * * *